US009584424B2

(12) United States Patent
Tsuji

(10) Patent No.: US 9,584,424 B2
(45) Date of Patent: Feb. 28, 2017

(54) QOS CONTROL SYSTEM, QOS CONTROL METHOD, AND PROGRAM

(71) Applicant: NEC Corporation, Minato-ku, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 72 days.

(21) Appl. No.: 14/406,802

(22) PCT Filed: Jun. 26, 2013

(86) PCT No.: PCT/JP2013/004014
§ 371 (c)(1),
(2) Date: Dec. 10, 2014

(87) PCT Pub. No.: WO2014/002500
PCT Pub. Date: Jan. 3, 2014

(65) Prior Publication Data
US 2015/0156124 A1 Jun. 4, 2015

(30) Foreign Application Priority Data
Jun. 29, 2012 (JP) ................. 2012-147327

(51) Int. Cl.
H04L 12/833 (2013.01)
H04L 12/813 (2013.01)
(Continued)

(52) U.S. Cl.
CPC .......... H04L 47/2458 (2013.01); H04L 47/20 (2013.01); H04L 47/6275 (2013.01); H04L 47/2408 (2013.01)

(58) Field of Classification Search
None
See application file for complete search history.

(56) References Cited

U.S. PATENT DOCUMENTS

2003/0053467 A1 3/2003 Miyamoto
2007/0133552 A1 6/2007 Kubo et al.
(Continued)

FOREIGN PATENT DOCUMENTS

JP 2003-69631 A 3/2003
JP 2003-92595 A 3/2003
(Continued)

OTHER PUBLICATIONS

International Search Report for PCT Application No. PCT/JP2013/004014, mailed on Sep. 24, 2013.

Primary Examiner — Kouroush Mohebbi

(57) ABSTRACT

Provided is a QoS control system, a QoS control method, and a program suitable for use in a server virtualization environment in which an I/O virtualization technology can be used. The QoS control system includes a network interface and a network interface management unit. The network interface holds a QoS (Quality of Service) parameter giving identification information for identifying traffic, a priority value to be applied to a packet belonging to the traffic, and information indicating the storage location of the priority value in the packet, stores the priority value in the packet belonging to the traffic, and then transmits a resulting packet. The network interface management unit holds a QoS policy including a QoS parameter to be applied to each traffic, and manages the network interface.

10 Claims, 17 Drawing Sheets

(51) Int. Cl.
*H04L 12/865* (2013.01)
*H04L 12/851* (2013.01)

(56) References Cited

U.S. PATENT DOCUMENTS

2007/0204036 A1* 8/2007 Mohaban ................ H04L 12/66
 709/224
2014/0233571 A1* 8/2014 Pope ....................... H04L 49/30
 370/392

FOREIGN PATENT DOCUMENTS

| JP | 2007-531353 A | 11/2007 |
| JP | 2010-283828 A | 12/2010 |
| JP | 2012-73660 A | 4/2012 |

* cited by examiner

QOS CONTROL SYSTEM, QOS CONTROL METHOD, AND PROGRAM

This application is a National Stage Entry of PCT/JP2013/004014 filed on Jun. 26, 2013, which claims priority from Japanese Patent Application 2012-147327 filed on Jun. 29, 2012, the contents of all of which are incorporated herein by reference, in their entirety.

TECHNICAL FIELD

The present invention is based upon and claims the benefit of the priority of Japanese Patent Application No. 2012-147327, filed on Jun. 29, 2012, the disclosure of which is incorporated herein in its entirety by reference thereto. The present invention relates to a QoS (Quality of Service) control system, a QoS control method, and a program. More specifically, the invention relates to a QoS control system, a QoS control method, and a program suitable for used in a server virtualization environment where an I/O virtualization technology can be used.

BACKGROUND ART

In recent years, due to improvement in performance and reliability of servers, introduction of virtualization of server resources (server virtualization) has been widely spread at a data center and the like. Due to a technology for the server virtualization, a service that has been operated on an individual physical server is operated on a virtual machine, and this virtual machine is held in one physical server. The number of physical servers can be thereby reduced. This makes it possible to reduce the introduction and operation costs of the servers.

FIG. 15 shows an example of a network architecture of a data center before introduction of the server virtualization technology. Referring to FIG. 15, the network of the data center is broadly divided into three layers constituted from Top-of-Rack switches (ToR switches) 12 to which servers 10 are connected, aggregation switches 14 each of which connects the ToR switches 12, and core switches 16 each of which connects the aggregation switch 14 and a network outside the data center. Each server 10 is connected to a corresponding one of the ToR switches 12 through a network interface card (NIC) 18.

On the other hand, FIG. 16 shows a network architecture where the server virtualization technology has been introduced into the environment shown in FIG. 15. Referring to FIG. 16, one or more virtual machines 20 operate within each server 10. Each virtual machine 20 is connected to the network outside the server 10 through a virtual switch 22. The virtual switch 22 is a switch implemented by software. The virtual switch 22 connects each virtual machine 20 and the NIC 18. The virtual switch 22 provides to the virtual machine communication between the virtual machines 20 inside the server 10 and connection to the network outside the server 10. That is, in the data center where the server virtualization technology has been introduced, the architecture in which the network switch is further connected to each ToR switch 12 is formed.

In the server virtualization environment, there is overhead for virtualization. Thus, there is a problem that it is difficult to provide high communication performance to each virtual machine 20. In order to solve this problem, a CPU (Central Processing Unit), a chip set, and the NIC 18 have got to support I/O virtualization. As an example of a technology for supporting the I/O virtualization, an I/O virtualization technology such as SR-IOV (Single Route I/O Virtualization) or IOMMU (Input Output Memory Management Unit) is present.

Use of such a technology makes it possible for the virtual machine 20 to directly access the NIC 18 not through the virtual switch 22, so that the overhead for virtualization can be reduced. Consequently, high performance can be provided to the virtual machine 20.

FIG. 17 shows an architecture of the server 10 using the I/O virtualization technology. Referring to FIG. 17, some of the virtual machines 20 that operate in the server 10 are directly connected to the NIC 18 not through the virtual switches 22. Generally, in the server virtualization environment, the virtual switch 22 operates in a region for managing the server virtualization environment, referred to as a virtual machine monitor 24 or a hypervisor. The NIC 18 provides a plurality of interfaces in order to support the I/O virtualization. The NIC 18 includes a physical interface 180 for connection to the virtual machine monitor 24 and virtual interfaces 181 each for connection to the virtual machine 20. The plurality of the virtual interfaces 181 are provided for one NIC 18. Referring to FIG. 17, each of virtual machines denoted VMa and VMb out of the virtual machines 20 is directly connected the NIC 18 through the virtual interface 181.

As one of methods of utilizing the data center as described above, an IaaS (Infrastructure as a Service) is present. In the IaaS, physical resources of the data center are logically divided, using the server virtualization technology and a technology such as a VLAN (Virtual LAN), to provide environments of computers and networks for different users. To take an example, the computer environment is provided in the form of the virtual machine 20, while the network is provided in the form of the VLAN. Each user can introduce an OS (Operating System) into the virtual machine 20 and can causes the virtual machines 20 to communicate with each other through the network, thereby enabling implementation of some service.

In the environment such as the IaaS, a plurality of users use the same environment. Thus, appropriate assignment and isolation of computer resources and network resources are important. With respect to the network resources, for example, it is demanded that QoS control be executed for each user to cause communication of a certain user not to affect communication of a different user. When the I/O virtualization technology is not used, the QoS control can be executed by the virtual switch 22. As an example of the QoS control, there is a method of assigning frames or packets to a respective plurality of prioritized queues based on a value set in a CoS (Class of Service) field included in a MAC (Media Access Control) frame, or a ToS (Type of Service) field or a DSCP (DiffServ Code Point) field of an IP (Internet Protocol) packet. These values are set at a switch that servers as an entry of a segment of the network for which the QoS control is to be performed, based on information such as an IP address included in the IP header. The setting process of these values is referred to as marking. The switch schedules transfer of the frames or the packets or performs link bandwidth assignment, based on the priority of each queue. There is an advantage that, when the marking is performed by the virtual switch 22, the ToR switch 12 does not need to support the process of the marking, so that the construction cost of the data center can be reduced.

However, when the I/O virtualization technology is used, a frame or a packet for which setting of the QoS control that should have been originally executed by the virtual switch 22 is not performed will arrive at the ToR switch 12. Further, since each of the virtual machines 20 (denoted VMa and VMb in FIG. 17) that uses the I/O virtualization technology can directly transmit a packet to the network through the NIC 18, a packet that has been marked to be convenient for the user can be transmitted. To take an example, the user of the virtual machine VMa in FIG. 17 can also set all packets to have a highest priority. The packet that is normal in view of the format of the packet is transmitted from the server 10. Thus, the ToR switch 12 cannot determine whether or not the packet transmitted from the server 10 has passed through the virtual switch 22. Consequently, the QoS control that does not satisfy the QoS policy of a data center manager may be executed.

Further, the bandwidth of a physical link between the server 10 and the ToR switch 12 may not be appropriately shared among the users. As described above, when the I/O virtualization technology is used, the virtual machine 20 that uses the I/O virtualization technology can occupy the link because the QoS control to be provided by the virtual switch 22 does not function.

An example of a technology for solving the problem as described above is described in Patent Literature 1. According to the Patent Literature, I/O logical partitions that control I/O of virtual machines of a user are present between the virtual machines and I/O adapters that support the I/O virtualization. By controlling each I/O logical partition by a system manager according to a predetermined policy, appropriate I/O control can be provided to the virtual machine. The I/O logical partition is connected to a virtual interface of I/O devices.

Another example of the technology for solving the problem described above is described in Patent Literature 2. Patent Literature 2 describes a technology in which NICs are virtualized to be set as a plurality of prioritized virtual network devices. By assigning a traffic flow to each virtual network device based on the priority of the traffic flow, influence of a traffic flow with a low priority on a traffic flow with a high priority can be reduced.

CITATION LIST

Patent Literature

[PTL 1] Japanese Patent Laid Open No. JP2012-073660A
[PTL 2] Japanese Patent Laid Open No. JP2010-283828A

SUMMARY OF INVENTION

Technical Problem

The following analysis has been given by the present invention.

The following problem is present in the technology disclosed in Patent Literature 1 described above. That is, a management region that controls I/O is present between the virtual machines of the user and the I/O devices. That is, communication through this management region is comparable to communication through the virtual machine monitor in the conventional virtualization environment. Thus, high performance, which is an advantage of supporting the I/O virtualization, cannot be obtained.

Further, the following problem is present in the technology disclosed in Patent Literature 2. That is, application of this technology to the server virtualization environment is comparable to assignment of a plurality of virtual network devices to each virtual machine and use of an appropriate one of the virtual network devices for each traffic. When each virtual network device can be directly accessed by the virtual machine due to the I/O virtualization technology, selection of the virtual network device is entrusted to the virtual machine. The virtual network device is used according to the convenience of the user. Consequently, the network will be used in a manner different from that in which the network is used according to the QoS policy of a system manager.

The above-mentioned two problems to be encountered by the use of the I/O virtualization technology is caused by absence of a control point between each of a plurality of the virtual machines 20 and the ToR switch 12 though the plurality of the virtual machines 20 are directly connected to respective ports of the ToR switch 12. This makes it impossible to mediate communication between the virtual machines 20. A situation where a plurality of servers are connected to one port of the ToR switch 12 normally cannot happen. Thus, the technologies described in Patent Literatures 1 and 2 cannot solve these problems.

It is an object of the present invention to provide a QoS control system, a QoS control method, and a program capable of executing QoS control over traffic according to a QoS policy set by a system manager even when each virtual machine performs communication using an I/O virtualization technology in a server virtualization environment where the I/O virtualization technology can be used.

Solution to Problem

According to a first aspect of the present invention, there is provided a QoS (Quality of Service) control system. The QoS control system comprises:
a network interface that holds a QoS parameter giving identification information for identifying traffic, a priority value to be applied to a packet belonging to the traffic, and information indicating a field of setting the priority value in the packet, sets the priority value in the packet belonging to the traffic, and then transmits a resulting packet. The QoS control system further comprises:
a network interface management unit that holds a QoS policy to be applied to each traffic and including a QoS parameter, and manages the network interface.

According to a second aspect of the present invention, there is provided a QoS (Quality of Service) control method. The QoS control method comprises the steps of:
notifying a QoS parameter to a network interface by referring to a QoS policy, the QoS parameter including identification information for identifying traffic, a priority value to be applied to a packet belonging to the traffic, and information indicating a field of setting the priority value in the packet; and
causing the network interface to set the priority value in the packet that matches the identification information, using the QoS parameter, and then to transmit a resulting packet.
This method is linked to a specific machine, which is a computer that sets the priority value to each packet to be transmitted and then transmits a resulting packet.

According to a third aspect of the present invention, there is provided a program that causes a computer to execute a process of:
notifying a QoS parameter to a network interface by referring to a QoS policy, the QoS parameter including identification information for identifying traffic, a priority value to be applied to a packet belonging to the traffic, and information indicating a field of setting the priority value in the packet, and that causes the network interface to set the priority value in the packet which matches the identification information, using the QoS parameter, and then to transmit a resulting packet. This program can be recorded in a computer readable (non-transient) recording medium. That is, the present invention can also be embodied as a computer program product.

Advantageous Effects of the Invention

According to the present disclosure, QoS control over traffic according to the QoS policy can be executed when each virtual machine performs communication using an I/O virtualization technology in a server virtualization environment where the I/O virtualization technology can be used.

DESCRIPTION OF EMBODIMENTS

Figure 1:
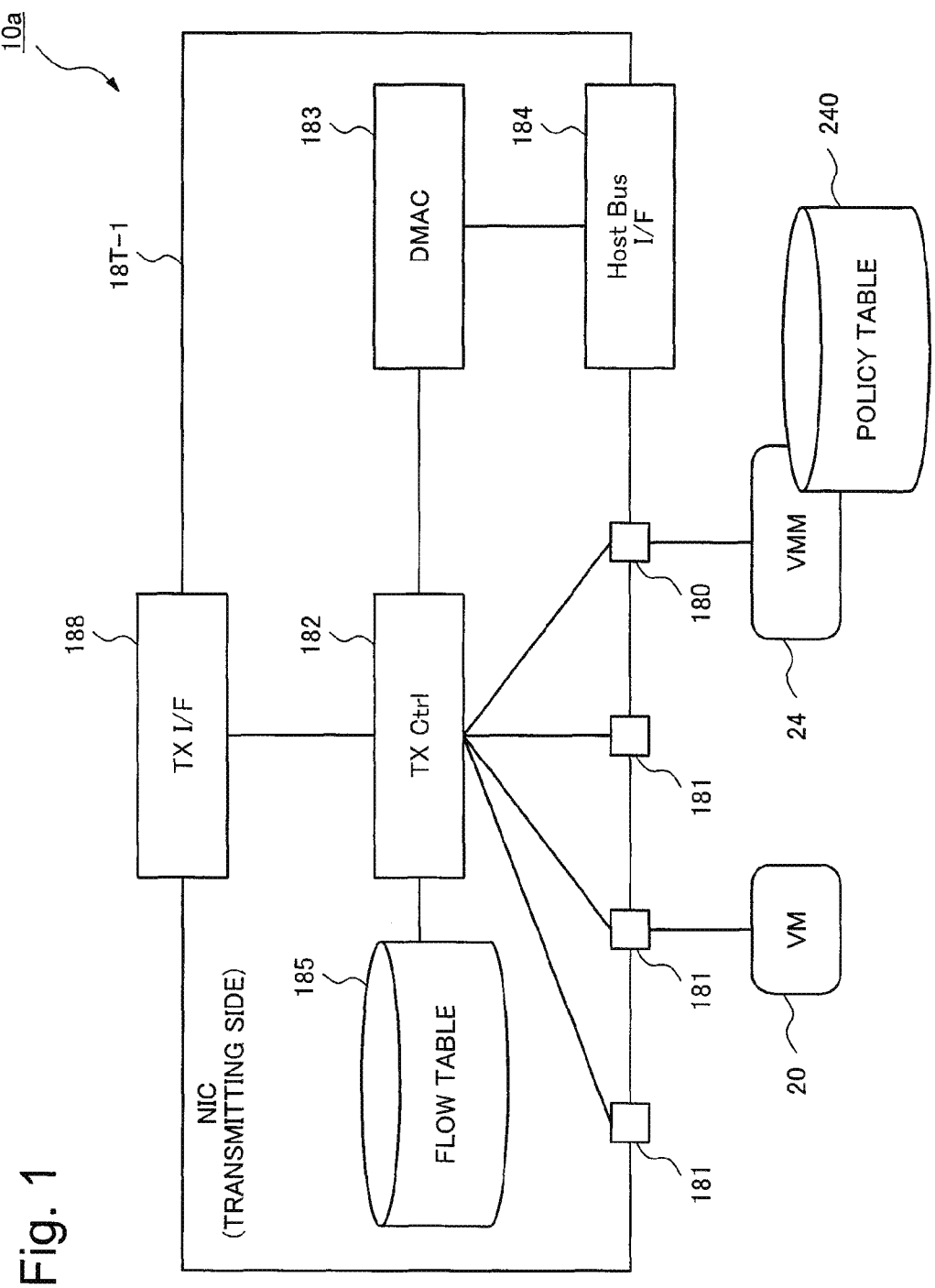
FIG. 1 is a diagram showing a configuration of a QoS control system according to a first exemplary embodiment of the present disclosure.

First, an overview of an exemplary embodiment of the present disclosure will be described with reference to a drawing. Reference signs in the drawing appended to this overview are appended to respective elements for convenience as an example of help understanding, and are not intended to limit the present disclosure to the mode(s) as illustrated.

The exemplary embodiment of the present disclosure can be implemented by a configuration including unit (185 in FIG. 1) for holding a QoS parameter on a network interface card, means (183 in FIG. 1) for obtaining a packet from a host memory, unit (182 in FIG. 1) for setting a priority value in the packet header of the obtained packet and then transmitting a resulting packet, and unit (24 in FIG. 1) for managing the network interface card.

More specifically, the QoS parameter includes identification information for identifying traffic, a priority value to be applied to a packet that belongs to the traffic, and information indicating the field of setting the priority value in the packet. A means (unit) for managing the network interface card holds a QoS policy (240 in FIG. 1) including the QoS parameter as mentioned above. The means for managing the network interface card notifies the QoS parameter to the network interface card, based on the QoS policy.

When receiving a request for transmitting the packet that has been issued from a virtual machine, the network interface card obtains the packet from the host memory. Next, the network interface card obtains the QoS parameter notified from the unit for managing the network interface card by referring to the unit for holding the QoS parameter, using information on the packet header of the obtained packet, and then obtains the priority value included in the QoS parameter. The network interface card sets the obtained priority value in the packet header of the packet, and then transmits a resulting packet. When the unit for holding the QoS parameter does not hold the QoS parameter that matches the packet obtained from the host memory, the network interface card makes an inquiry to the means for managing the network interface card about the QoS parameter that is appropriate, thereby obtaining the appropriate QoS parameter. With this arrangement, the priority value set in the network interface card is applied to the packet to be transmitted.

As described above, the QoS policy of a system manager is applied to even an environment where the virtual machine can directly issue the packet transmission request to the network interface card using an I/O virtualization technology. The packet is thereby transmitted. The reason for transmission of the packet according to the QoS policy of the system manager is that the network interface card is configured to refer to the table where the QoS parameter is stored, and then to apply the QoS parameter compliant with the policy of the system manager to the packet header, based on the header information of the packet obtained in response to the packet transmission request.

First Exemplary Embodiment

Next, a first exemplary embodiment of the present disclosure will be described in detail with reference to drawings. In the following description, a unit of data to be transferred to a network is uniformly described as a "packet", this description does not limit the type of the network or the like to which the present disclosure is applied. Hereinafter, a series of packet sequences that is also referred to as a "flow" will be described as "traffic". To take an example, when downloading a certain file using FTP (File Transfer Protocol), packets that have flowed from a start to completion of downloading of the certain file will be collectively described as traffic.

FIG. 1 is a diagram showing a configuration of a QoS control system according to the first exemplary embodiment. Referring to FIG. 1, a QoS control system 10*a* including a NIC 18T-1, a virtual machine (VM) 20, and a virtual machine monitor (VMM) 24 is shown. The virtual machine 20 and the virtual machine monitor 24 are computer programs that operate under an environment of a server 10. Each of the virtual machine 20 and the virtual machine monitor 24 is implemented by using various resources such as CPU, memory, disks, and I/O of the server and the like that constitute the QoS control system 10*a*. Hereinafter, the memory of the server and the like that constitute the QoS control system 10*a* will be described as a "host memory".

The NIC 18T-1 shows a configuration on the transmitting side of a NIC 18. The NIC 18T-1 includes a physical interface 180, virtual interfaces 181, a TX controller (TX Ctrl) 182, a DMA controller (DMAC) 183, a host bus interface (Host Bus I/F) 184, a flow table 185, and a TX interface (TX I/F) 188.

The physical interface 180 is an interface for the virtual machine monitor 24 in an I/O virtualization technology, and includes an interface for controlling the NIC 18T-1. As the examples of controlling the NIC 18T-1, notification of an entry to be set in the flow table 185, reading of a status of the virtual interface 180, and the like may be pointed out. As an implementation example of the physical interface 180, an SR-IOV physical function may be pointed out. In SR-IOV, the physical function includes all general functions to be provided by a PCI-Express interface.

The virtual interface 181 is an interface for directly accessing the NIC 18T-1 by the virtual machine 20 using the I/O virtualization technology. As an implementation example of the virtual interface 181, an SR-IOV virtual function may be pointed out. In the SR-IOV, the virtual function is implemented by utilizing only a portion of resources for the physical function.

The virtual machine 20 issues a packet transmission request to the NIC 18T-1 through the virtual interface 181. The packet transmission request includes at least a transmission packet size and the address of the host memory in which a transmission packet is stored. Depending on the case, transmission packets may not be stored in consecutive regions of the host memory. In this case, a plurality of lists including sizes and addresses of the transmission packets are included in the packet transmission request. This arrangement, however, does not provide an essential difference to the present disclosure. Thus, the description will be given, assuming that the packets are stored in the consecutive regions of the host memory.

The TX controller 182 is a controller that controls a packet transmission process of the NIC 18T-1. Preferably, the TX controller 182 includes a packet buffer in its inside, and can hold a certain number of packets. The TX controller 182 obtains, from the packet transmission request issued through the virtual interface 181, the transmission packet size and the address of the host memory in which the transmission packet is stored, and then issues a request for reading the transmission packet to the DMA controller 183. Then, the TX controller 182 sets (marks) a value indicating priority (hereinafter described as a priority value) in QoS in the packet that has been read, and then transfers a resulting packet to the TX interface 188.

The flow table 185 is a table that holds a QoS parameter to be set in the transmission packet. At least information indicating in which field of the packet header the priority value is to be set and the priority value to be set are included as the QoS parameter. To take an example, at least a value specifying one of a CoS field, a ToS field, and a DSCP filed and the priority value to be set in the specified field are included in the QoS parameter. Prioritization of traffic may be enabled by a vendor's own method such as the ISL (Inter Switch Link) method implemented by the Cisco Systems, Inc. Thus, the number of bytes/bits from the start of the packet header, the priority value to be set, and the size (the number of bytes/bits) of the priority value to be set, for example, may be held in the flow table. This arrangement depends on the function to be supported by the NIC 18T-1, and does not provide a substantial difference to the present disclosure.

Each entry of the flow table 185 holds traffic identification information included in header information of a packet in association with the QoS parameter, as a key for searching the QoS parameter. As the traffic identification information, an IP address, a TCP (Transmission Control Protocol)/UDP (User Datagram Protocol) port number included in the packet header may be pointed out.

The flow table 185 can be implemented in the form of a TCAM (Ternary Content Addressable Memory), for example.

The TX controller 182 refers to the flow table 185 and then obtains the priority value to be set in the packet, using information on the header of the packet that has been obtained. The TX controller 182 performs marking of the packet, using the obtained priority value, and transfers the packet to the TX interface 188.

Error detection data may be given to the packet, depending on a network. In the Ethernet (trade mark), for example, an FCS (Frame Check Sequence) is given to the tail end of a packet, and a result of calculation of a CRC (Cyclic Redundancy Check) value using data from the destination MAC address to the tail end of the payload of the packet is given to the FCS. When the marking is performed, the content of the packet is rewritten. Thus, it is preferable that the TX controller 182 perform calculation of the error detection data again and applies a result of the calculation to the appropriate field of the packet.

When no corresponding entry is present in the flow table 185, the TX controller 182 makes an inquiry to the virtual machine monitor 24 about the QoS parameter to be applied to this packet, through the physical interface 180. Out of the packet header information, information that can be registered in the flow table 185 (information to be used as the traffic identification information) is included in this inquiry. The TX controller 182 notifies the virtual machine monitor 24 of the inquiry in the form of an interrupt to the CPU on a host side.

The DMA controller 183 performs a process of reading data stored in the memory through the host bus data interface 184, in response to the inquiry from the TX controller 182.

The host bus interface 184 is an interface that connects the server 10 and the NIC 18T-1. In PCI Express, for example, the host bus interface 184 corresponds to an interface for issuing a command for DMA transfer or a register that stores data transferred from the host side.

The TX interface 188 is a physical interface for the network of the NIC 18T-1. The TX interface 188 transmits the packet received from the TX controller 182 to the network. When the TX interface 188 transmits the packet, a ToR switch 12 performs a process of adding a signal for detecting beginning of the packet to the front of the packet or the like. When the network is the Ethernet, for example, the front of the packet corresponds to a preamble portion.

The virtual machine 20 is a virtual computer whereby a user can run an application using the resources (such as CPU, memory, disks, I/O interfaces and the like) of the server 10 assigned from a system manager. Generally, in an IaaS environment, the user prepares for an OS by himself, and introduces the OS into the virtual machine 20, thereby preparing for an environment for executing the application.

The virtual machine monitor 24 includes a policy table 240, in addition to a virtual switch 22. The virtual machine monitor 24 refers to entries of the policy table 240, selects the QoS parameter that is appropriate, and then notifies the appropriate QoS parameter to the NIC 18T-1, in response to the inquiry from the NIC 18T-1.

A policy for priority of each traffic defined by a network manager is stored in the policy table 240. As an example of the policy, a policy constituted from the traffic identification information such as IP address or TCP/UDP port number of a packet, for identifying the traffic, the priority value of the traffic, and information indicating the location of the packet where the priority value is to be set may be considered. In this case, the policy table 240 is a superset of the flow table 185. As another example of the policy, holding of a value that does not depend on a specific prioritization scheme using CoS or ToS, as the priority value, may be considered. In this case, it is necessary to perform a process of translating the priority value obtained by referring to the policy table 240 to setting suitable for QoS control to be actually used. Assume, for example, that 64 levels (constituted from 6 bits) of priorities of 0 to 63 are held in the policy table 240 and a QoS control mechanism to be used on the network is the ToS. Since 8 levels of priorities are used in the ToS, the following mapping of {values of the policy table 240, ToS priority} is performed: {0 to 7, 0}, {8 to 15, 1}, {16 to 23, 2}, {24 to 31, 3}, {32 to 39, 4}, {40 to 47, 5}, {48 to 55, 6}, {56 to 63, 7}.

The TX controller 182 makes the inquiry to the virtual machine monitor 24 about the QoS parameter to be used for the packet when handling the packet for which the corresponding entry is not present in the flow table 185. When the virtual machine monitor 24 refers to the policy table 240 and then notifies to the TX controller 182 the QoS parameter to be set, the TX controller 182 stores the notified QoS parameter in the flow table 185. Thereafter, the TX controller 182 applies the priority value included in the notified QoS parameter to a packet to which the QoS parameter should be applied. This notification of the QoS parameter may be performed through a register in the physical interface 180, for example. That is, by writing the QoS parameter in the specific register in the physical interface 180 by the virtual machine monitor 24, the TX controller 182 may be triggered to achieve registration of the QoS parameter in the flow table 185 and application of the priority value to the packet. When such a mechanism is used, the virtual machine monitor 24 can also register a flow entry in the flow table 185 in advance. To take an example, by registering the policy for traffic with a high frequency of communication in the flow table 185 in advance, an inquiry to the virtual machine monitor 24 can be reduced.

Next, an overall operation of this exemplary embodiment will be described in detail with reference to sequence diagrams in FIGS. 2 and 3 and flowcharts in FIGS. 4 and 5.

Figure 2:
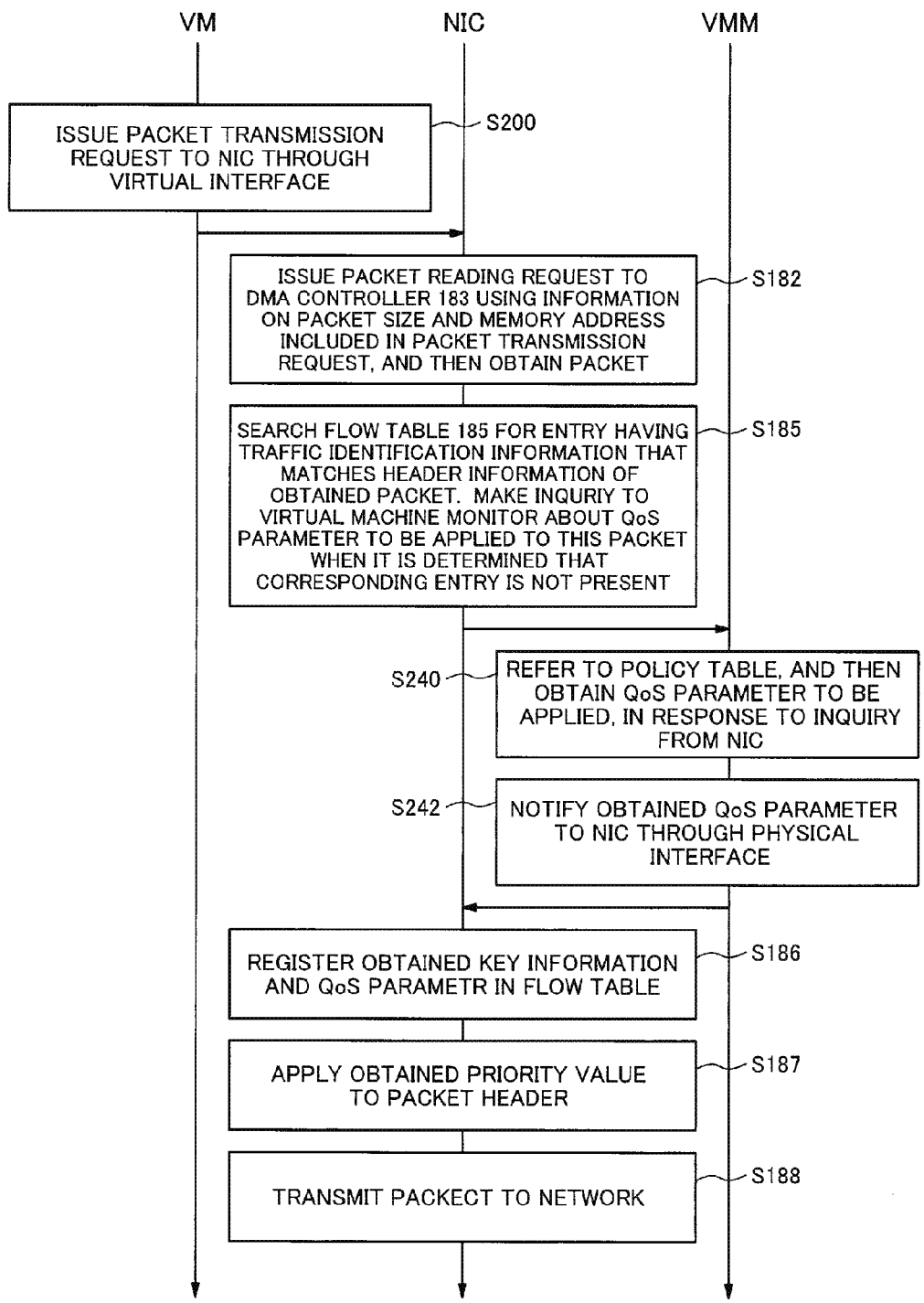
FIG. 2 is a sequence diagram showing a packet transfer process of the QoS control system according to the first exemplary embodiment of the present disclosure (when a corresponding entry is not present in a flow table of a NIC).

FIG. 2 is a sequence diagram showing a packet transfer process of the QoS control system in the first exemplary embodiment (when a corresponding entry is not present in the flow table of the NIC). Specifically, FIG. 2 shows the packet transfer process when the entry corresponding to a packet to be transmitted is not present in the flow table 185 of the NIC 18T-1 though the virtual machine 20 issues a request for transmitting the packet.

First, the virtual machine 20 issues the request for transmitting the packet to the NIC 18T-1 through the virtual interface 181 (in step S200 in FIG. 2). The transmission request includes at least the size of the packet to be transferred and the address of the host memory in which the packet is stored. The issued request for transmitting the packet is interpreted at the TX controller 182 included in the NIC 18T-1.

Next, when receiving the request for transmitting the packet from the virtual machine 20, the TX controller 182 issues a request for reading the packet to the DMA controller 183, using information on the size of the packet and the memory address included in the request for transmitting the packet, and then obtains the packet (in step S182 in FIG. 2). The obtained packet is stored in the packet buffer included in the TX controller 182.

Next, the TX controller 182 searches the flow table 185 for the entry having the traffic identification information that matches the header information of the obtained packet. When it is determined as a result of the search that the corresponding entry is not present in the flow table 185, the TX controller 182 makes an inquiry to the virtual machine monitor 24 about the QoS parameter to be applied to this packet through the physical interface 180 (in step S185 in FIG. 2). This inquiry includes at least information in the same field of the packet header as that for the key that can be used when the flow table 185 is searched, or the information to be used as the traffic identification information.

Next, when receiving the inquiry about the QoS parameter from the NIC 18T-1, the virtual machine monitor 24 refers to the policy table 240 and then obtains the QoS parameter to be applied to this packet, using the information in the packet header included in the inquiry (in step S240 in FIG. 2). As described above, when the policy held in the policy table 240 does not depend on the specific prioritization scheme, the process of mapping the policy obtained from the policy table 240 to the prioritization scheme to be used on the network is executed.

Next, the virtual machine monitor 24 notifies the obtained QoS parameter to the NIC 18-T1 through the physical interface 180 (in step S242 in FIG. 2).

Then, the TX controller 182 stores the QoS parameter notified from the virtual machine monitor 24 in the flow table 185 (in step S186 in FIG. 2).

Next, the TX controller 182 applies the priority value included in the obtained QoS parameter to the packet header (in step S187 in FIG. 2). When the TX controller 182 applies the priority value, the TX controller 182 calculates error detection data of the packet again, and then applies the calculated error detection data to the corresponding field of the packet.

Next, the TX controller 182 transfers the packet with the priority value set therein to the TX interface 188 to transmit the packet to the network (in step S188 in FIG. 2).

Since the process in step S186 in FIG. 2 and the processes in steps S187 to S188 in FIG. 2 are not dependent with each other, the steps of the processes may be interchanged. That is, it is also possible to execute the process in step S186 in FIG. 2 after or simultaneously with execution of the processes in steps S187 to S188 in FIG. 2.

Here, a description will be directed to an operation of the TX controller 182 when the TX controller 182 does not include the buffer for holding the entirety of the packet. In this case, even if the entirety of the packet has been read in step S182 in FIG. 2, the buffer cannot hold a region (payload portion) after the packet header of the packet during the inquiry about the QoS parameter in steps S185 to 186 in FIG. 2. Thus, the packet is to be discarded. As a result, the bandwidth of an internal bus of the PCI-Express or the like in the server that constitutes the QoS control system 10a will be used wastefully.

In this case, the TX controller 182 first issues a request for reading only the packet header to the DMA controller 183 in step S182 in FIG. 2, and then obtains the packet header of the packet to be transmitted. In this case, when the size of the packet header is known in advance, it is possible to use the size of the packet header. However, when the size of the packet header is changeable, the data size may be specified from the beginning of the packet, using a fixed value.

Subsequent processes in step S185 to S187 in FIG. 2 are the same as those when the TX controller 182 includes the buffer for holding the entirety of the packet. Then, when the process in step S188 is executed, the TX controller 182 issues another request for reading the payload portion of the packet to the DMA controller 183, adds the payload portion after the packet header to which the QoS parameter has been applied in step S187 in FIG. 2, and then transmits a resulting packet. In this case, the error detection data for the packet is calculated and is then applied to the packet after the payload portion of the packet has been read.

The packet is prioritized at the NIC 18T-1 according to the packet transmission request issued from the virtual machine 20, using the above-mentioned operations. The packet is thereby transmitted to the network.

Figure 3:
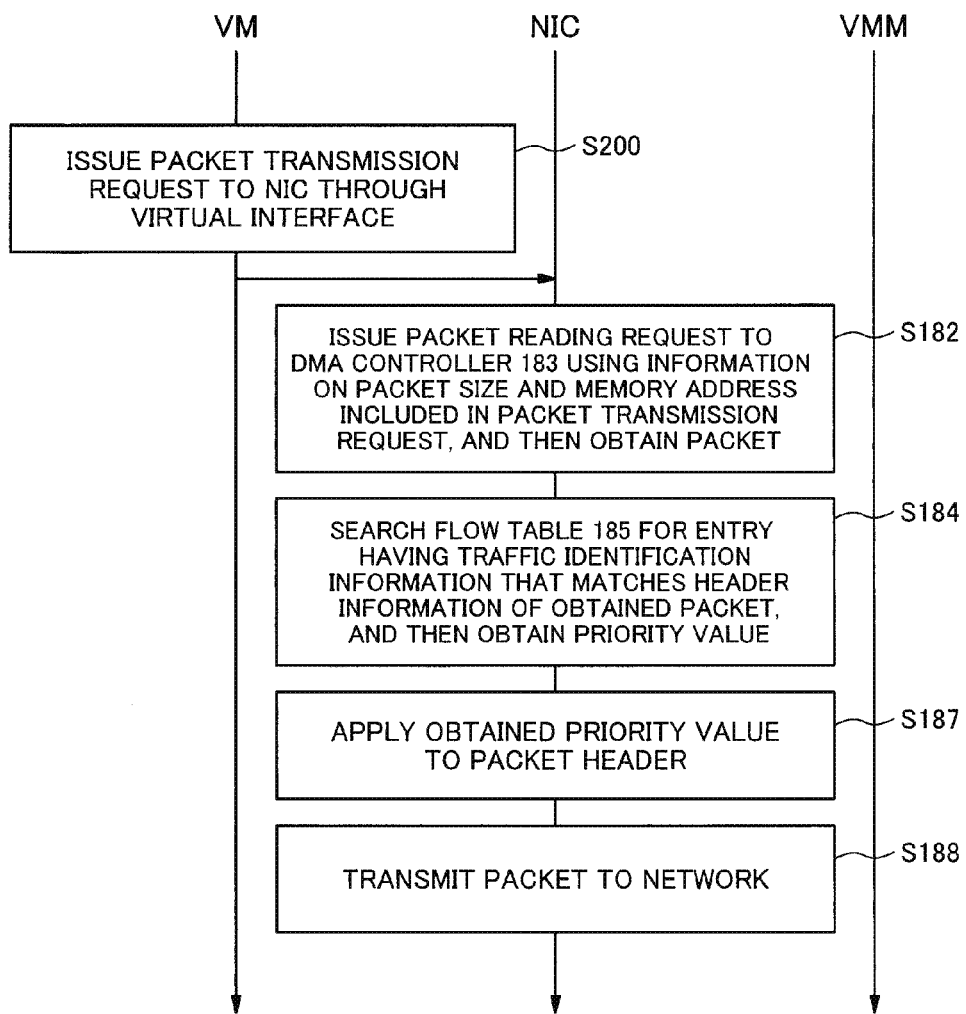
FIG. 3 is sequence diagram showing a packet transfer process of the QoS control system according to the first exemplary embodiment of the present disclosure (when the corresponding entry is present in the flow table of the NIC).

FIG. 3 is a sequence diagram showing a packet transfer process in the QoS control system according to the first exemplary embodiment (when the corresponding entry is present in the flow table of the NIC). More specifically, FIG. 3 shows the packet transfer process when the virtual machine 20 issues the request for transmitting the packet and then the entry corresponding to the packet to be transmitted is present in the flow table 185 of the NIC 18T-1. Same reference signs are given to the processes that are the same as those in FIG. 2, thereby omitting a detailed description of the processes that are the same as those in FIG. 2.

When the TX controller 182 receives the request for transmitting the packet from the virtual machine 20, the TX controller obtains the packet header of the packet to be transmitted, through the DMA controller 183 (in steps S200 to step S182 in FIG. 3). Then, the TX controller 182 refers to the flow table 185 and then obtains the priority value to be applied to the packet, using the information of the packet header (in step S184 in FIG. 3).

The packet with the priority value set therein in step S187 in FIG. 3 as in FIG. 2 is transmitted to the network (in step S188 in FIG. 3).

Figure 4:
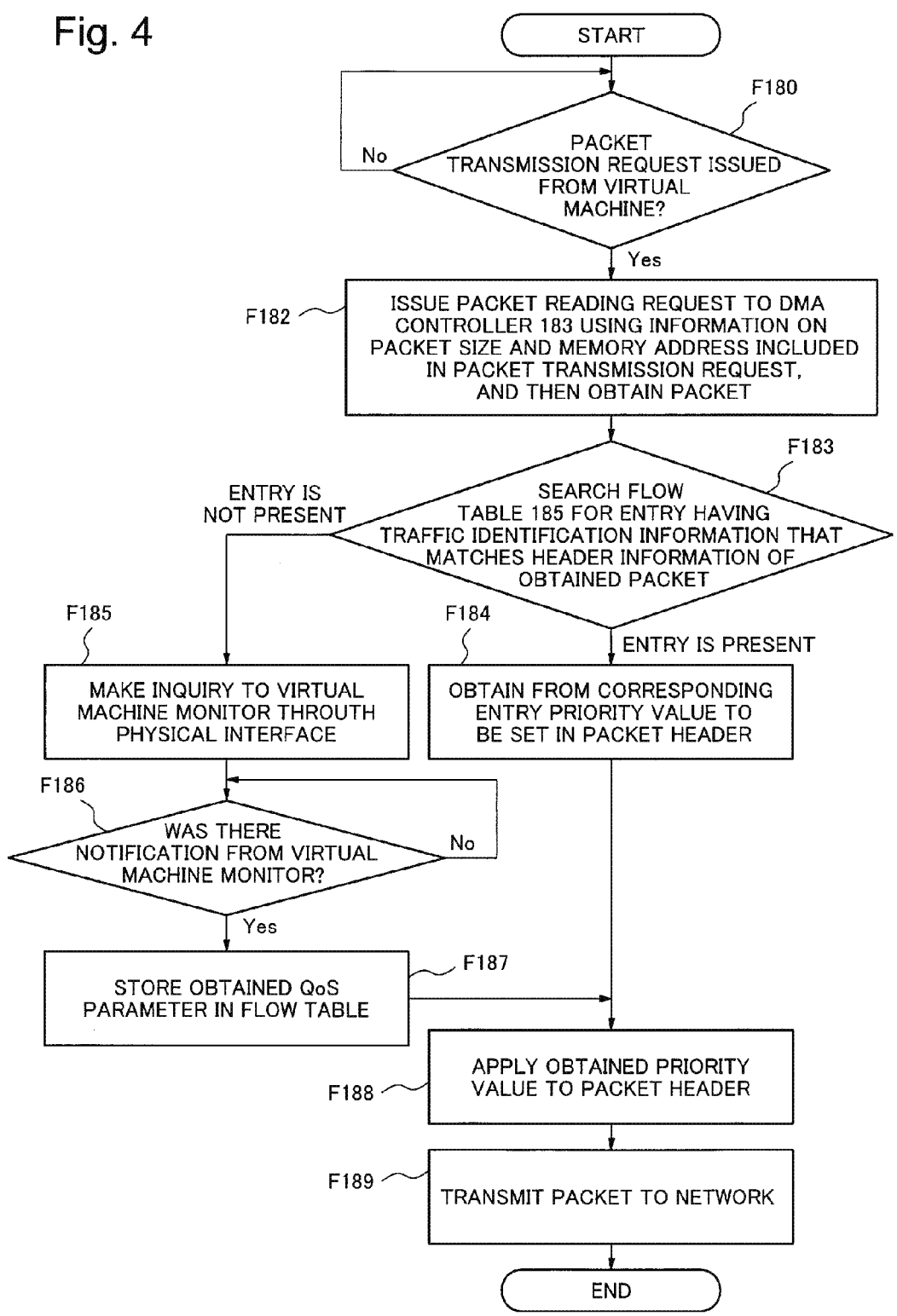
FIG. 4 is a flowchart showing operations of the NIC in the QoS control system according to the first exemplary embodiment of the present disclosure.

FIG. 4 is a flowchart showing processes of the TX controller 182 in the sequence diagrams in FIGS. 2 and 3 in detail.

First, when the request for transmitting the packet is issued from the virtual machine 20 (Yes in step F180 in FIG. 4), the TX controller 182 issues the request for reading the packet to the DMA controller 183, using the information on the address of the host memory where the packet to be transmitted is stored and the size of the packet to be transmitted (in step F182 in FIG. 4). When the request for transmitting the packet is not issued from the virtual machine 20 (No in step F180 in FIG. 4), the TX controller 182 does not start the process.

Next, the TX controller 182 searches the flow table 185 for the entry having the traffic identification information that matches the obtained header information of the packet (in step F183 in FIG. 4).

When the corresponding entry is present in the flow table 185 ("entry is present" in step F183 in FIG. 4), the TX controller 182 obtains the priority value to be applied to the packet from the corresponding entry in the flow table 185 (in step F184 in FIG. 4).

On the other hand, when the entry is not present in the flow table 185 ("entry is not present" in step F183 in FIG. 4), the TX controller 182 makes the inquiry to the virtual machine monitor 24 about the QoS parameter, through the physical interface 180 (in step F185 in FIG. 4).

Next, when notification of the QoS parameter is made from the virtual machine monitor 24 (Yes in step F186 in FIG. 4), the TX controller 182 stores the obtained QoS parameter in the flow table 185 (in step F187 in FIG. 4). On the other hand, when the notification of the QoS parameter is not made from the virtual machine monitor 24 (No in step F186 in FIG. 4), the TX controller 182 waits for the notification from the virtual machine monitor 24.

Next, the TX controller 182 applies the obtained priority value to the packet header (in step F188 in FIG. 4). When the TX controller 182 applies the priority value, the TX controller 182 calculates the error detection data for the packet, and then applies the calculated error detection data to the packet.

Next, the TX controller 182 transmits the packet with the priority value set therein to the network through the TX interface (in step F189 in FIG. 4).

In this manner, the TX controller 182 prioritizes the packet, and then transmits the prioritized packet to the network.

Figure 5:
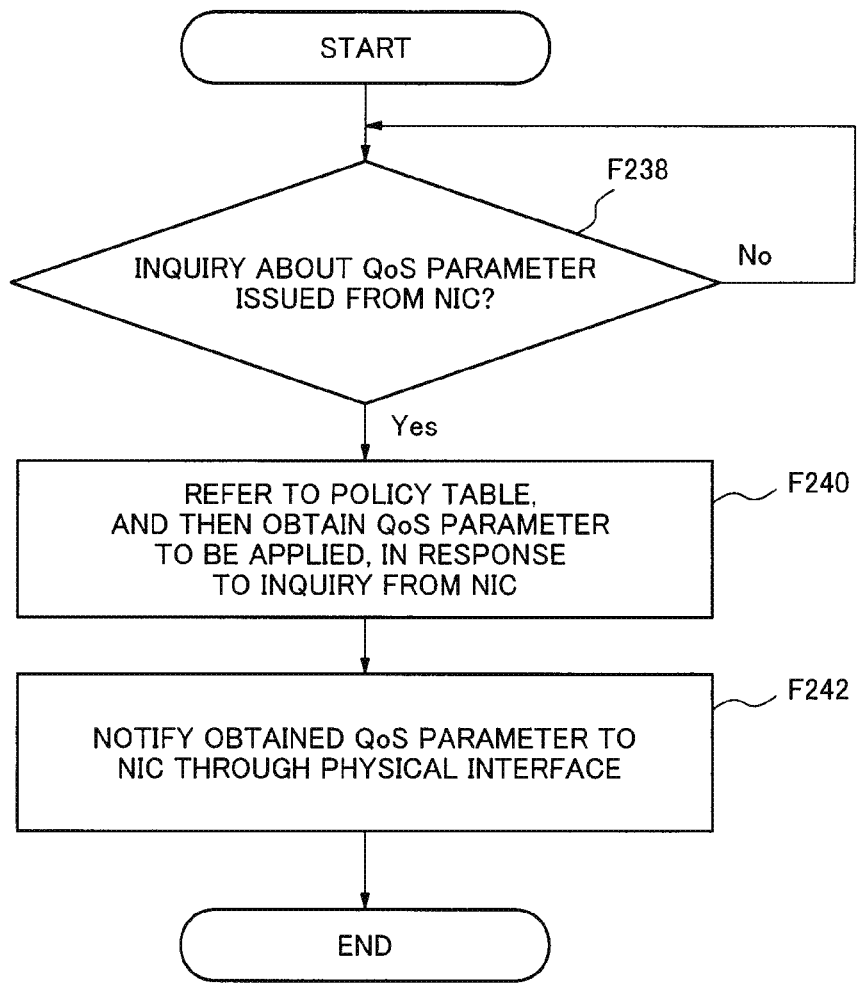
FIG. 5 is a flowchart showing operations of a virtual machine monitor in the QoS control system according to the first exemplary embodiment of the present disclosure.

FIG. 5 is a flowchart showing operations of the virtual machine monitor 24 in detail in the sequence diagram in FIG. 2.

First, when receiving the inquiry about the QoS parameter from the NIC 18T-1 (Yes in step F238 in FIG. 5), the virtual machine monitor 24 refers to the policy table 24 and then obtains the corresponding QoS parameter, in response to the inquiry from the NIC 18T-1 (in step F240 in FIG. 5). When there is no inquiry about the QoS parameter from the NIC 18T-1 (No in step F238 in FIG. 5), the virtual machine monitor 24 does not start the process.

Next, the virtual machine monitor 24 notifies the obtained QoS parameter to the NIC 18T-1 through the physical interface 180 (in step F242 in FIG. 5).

In this manner, the virtual machine monitor 24 notifies the QoS parameter, in response to the inquiry from the TX controller 182.

Figure 17:
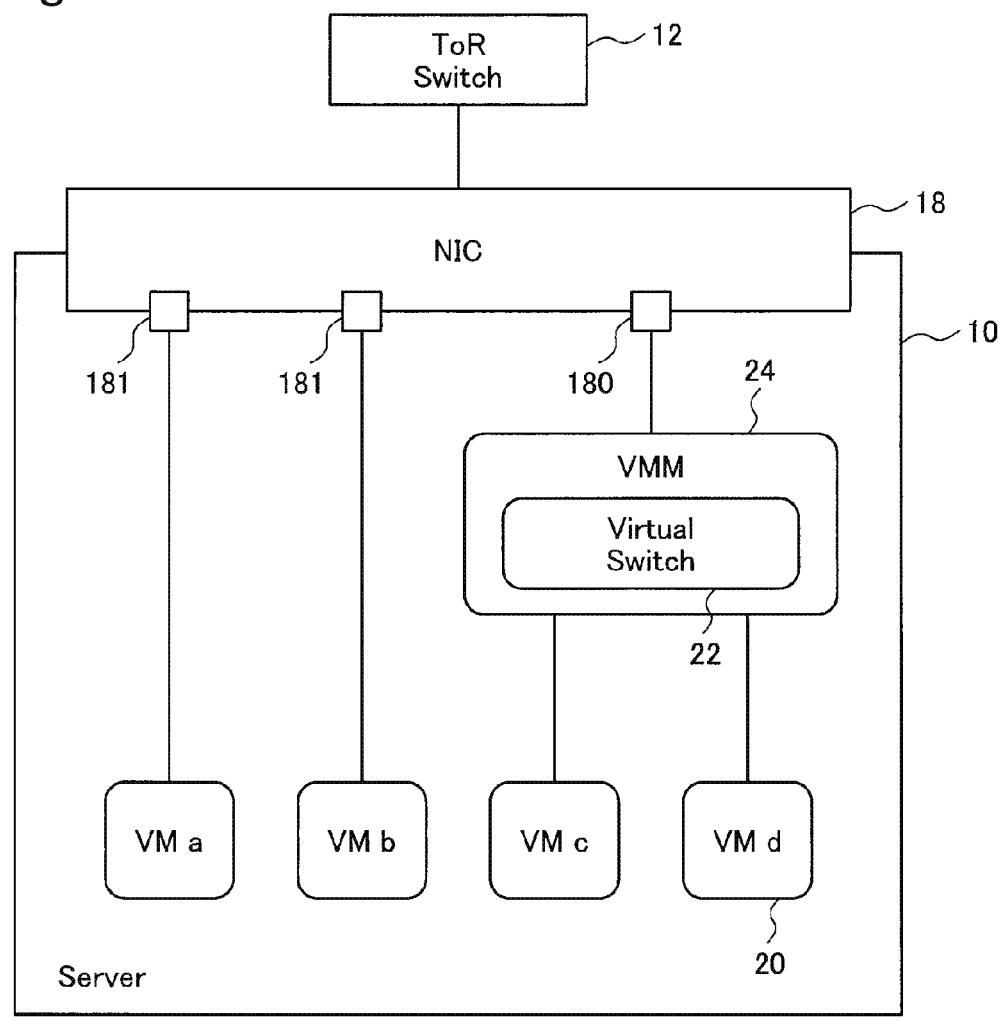
FIG. 17 is a diagram showing an architecture of a server using a technology for supporting I/O virtualization.

Now, a description will be directed to a process of the NIC 18T-1 when the virtual machines 20 (denoted VMc and VMd in FIG. 17, for example) connected to the virtual switch 22 included in the virtual machine monitor 24 are disposed in the QoS control system 10a.

The priority value of a packet to be transmitted by the virtual machine 20 connected to the virtual switch 22 can be set by the virtual switch 22 by referring to the policy table 240.

Further, generally, in the NIC 18 that has accommodated I/O virtualization, the physical interface 180 and each virtual interface 181 can be identified, using its own ID.

When the virtual switch 22 transmits a packet to the NIC 18T-1, the virtual switch 22 issues a request for transmitting the packet to the NIC 18T-1.

For that reason, assuming that, in the packet to be transmitted, the priority value based on the policy of the system manager is set, the TX controller 182 does not perform the processes as shown in FIG. 4 for the transmission request issued from the virtual switch 22 through the physical interface 180. The TX controller 182 can transmit to the network the packet read from the host memory by the DMA controller 183 based on the transfer size and the address included in the request for transmitting the packet without alteration.

On the other hand, when a load on the virtual machine monitor 24 increases, communication performance of each virtual machine 20 connected to the virtual switch 22 may deteriorate due to overhead for setting the priority value.

In such a case, an operation of the NIC 18T-1 may be switched so that addition of the priority value is performed by the NIC 18T-1 rather than the virtual switch 22.

To take an example, a setting register capable of switching whether or not to add the priority value to a packet transmitted through the physical interface 180 is provided at the NIC 18T-1. Setting of this setting register can be performed by the virtual machine monitor 24 through the physical interface 180.

When the virtual machine monitor 24 determines that the load on the virtual machine monitor 24 has increased based on information on a CPU usage rate or the like, the virtual machine monitor 24 performs the setting of this setting register. Addition of the priority value to the packet by the NIC 18T-1 can be thereby performed. In this case, the NIC 18T-1 executes the processes as shown in FIG. 4, in response to a request for transmitting the packet from the virtual switch 22. The packet with the priority value given thereto is thereby transmitted to the network.

Alternatively, by providing a plurality of interfaces between the virtual machine monitor 24 and the NIC 18-T1, or by providing a plurality of registers to each of which a request for transmitting a packet is to be written at the physical interface 180, use of the virtual switch 22 or the NIC 18T-1 for performing addition of the priority value can be switched.

To take an example, in addition to the physical interface 180, the virtual interface 181 is assigned as an interface between the virtual machine monitor 24 and the NIC 18-T1. Then, when addition of the priority value is performed by the virtual switch 22, a request for transmitting a packet is issued to the physical interface 180. When addition of the priority value is performed by the NIC 18-T1, the request for transmitting a packet is issued to the virtual interface 181. Alternatively, also when the plurality of registers to each of which the request for transmitting a packet is to be written are provided at the physical interface 180, use of a register to which the request for transmitting a packet is to be issued is switched similarly, according to whether or not addition of the priority value is performed by the virtual switch 22.

With this arrangement, when a load on the virtual machine monitor 24 has increased, control can also be so performed that, for only traffic that has caused the increase of the load, addition of the priority value to a packet belonging to the traffic is performed by the NIC 18-T1. In this case, by monitoring the number of packets that have passed through the virtual switch 22 per unit time and a data size, the traffic that has caused the increase of the load can be identified.

As described above, in this exemplary embodiment, the NIC 18T-1 sets the priority value in a packet to be transmitted by the I/O virtualization technology, according to the QoS parameter stored in the flow table 185. This QoS parameter is set in the flow table 185, or applied to a packet to be transmitted, according to an instruction from the virtual machine monitor 24, based on the policy of the system manager. For this reason, high performance can be implemented by the I/O virtualization technology. Further, it can be prevented that the priority value set by the user of the virtual machine 20 is used for priority control on the network.

Second Exemplary Embodiment

Figure 6:
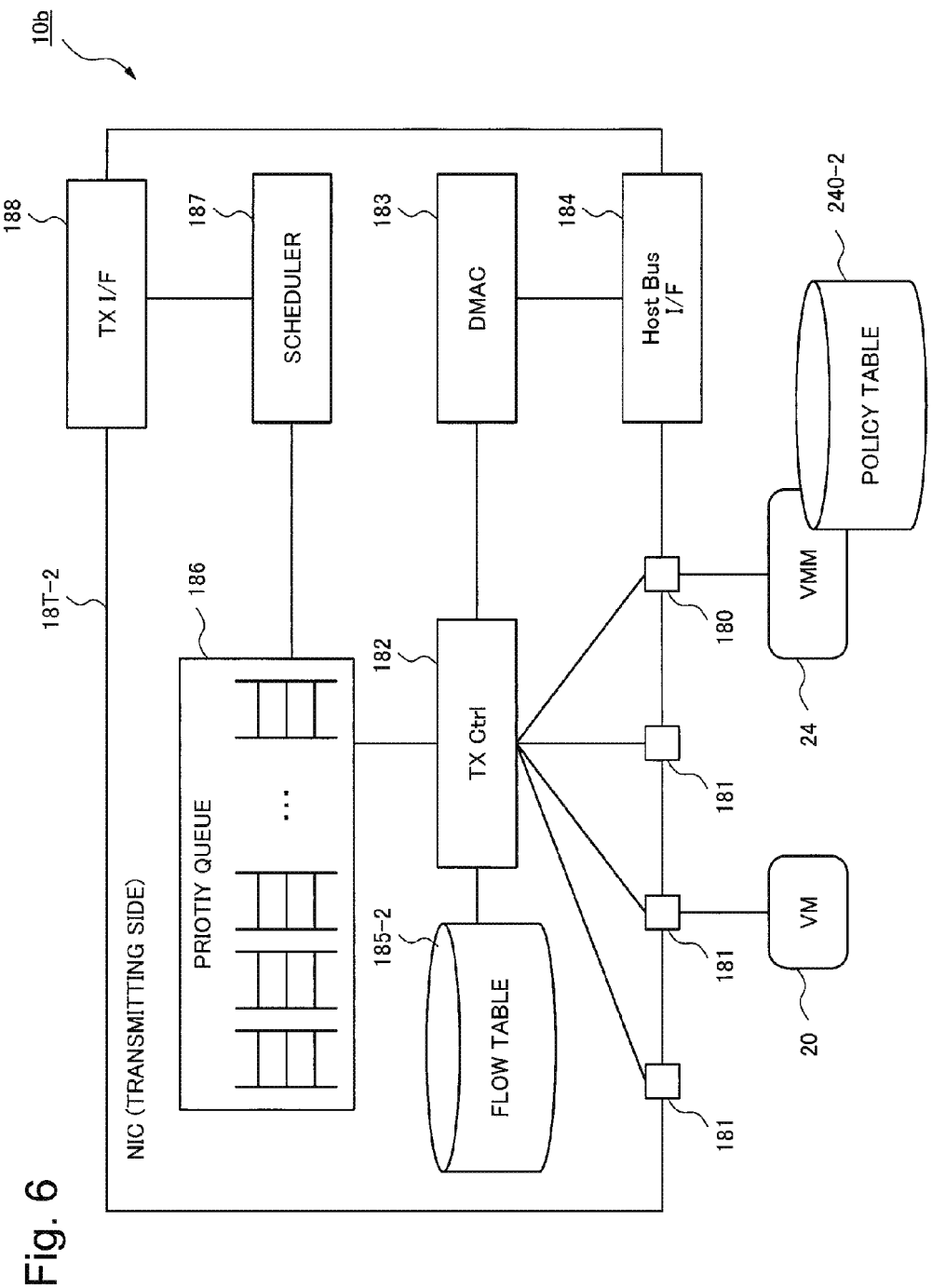
FIG. 6 is a diagram showing a configuration of a QoS control system according a second exemplary embodiment of the present disclosure.

Next, a second exemplary embodiment of the present disclosure will be described in detail with reference to drawings. FIG. 6 is a diagram showing a configuration of a QoS control system 10b according to the second exemplary embodiment of the present disclosure. Referring to FIG. 6, the second exemplary embodiment of the present disclosure is the one in which a priority queue 186 and a scheduler 187 are added to the configuration in the first exemplary embodiment of the present disclosure shown in FIG. 1, and a flow table 185-2 and a policy table 240-2 are altered. Same reference signs are given to the other components that are the same as those in the first exemplary embodiment of the present disclosure, and a detailed description of the components that are the same as those in the first exemplary embodiment of the present disclosure will be omitted.

The priority queue 186 is constituted from a plurality of queues having mutually different priorities. Each queue has a depth with one or more stages. Each stage of the queue has a region capable of storing a packet in which the TX controller 182 has set the priority value. Preferably, the number of the queues included in the priority queue 186 is equivalent to the number of QoS priority queues for each port to be supported by a network switch for a general data center. Due to the mounting cost of the NIC 18T-2 or the like, the number of the queues included in the priority queue 186 may be smaller than the number of QoS priority queues for each port. The virtual machine monitor 24 can know at least the number of the queues that constitute the priority queue 186 and the priority of each queue in the NIC 18T-2 through the physical interface 180.

The flow table 185-2 is a table that holds a parameter to be set in a packet to be transmitted. Each entry includes, as a QoS parameter, queue identification information indicating in which queue of the priority queue 186 the packet is to be stored, in addition to the parameter held by the flow table 185 in the first exemplary embodiment.

The scheduler 187 transmits each packet stored in the priority queue 186 to the network according to the priority of the queue in which the packet is stored. As a method of scheduling packet transmission, a method of not transmitting the packet stored in the queue with a low priority until the queue with a high priority gets empty, or a method of performing weighting based on the priority of each queue, and transmitting the packet from each queue based on the ratio of the weighting may be considered. Through the physical interface 180, the virtual machine monitor can detect and specify what kind of the scheduling method is being used or which one of a plurality of scheduling methods is to be used when the plurality of scheduling methods are supported.

A QoS policy for each traffic that has been defined by a network manager is stored in the policy table 240-2. As information constituting the QoS policy, the queue identification information indicating in which queue of the priority queue 186 the packet is to be stored is included, in addition to the information stored in the policy table 240 in the first exemplary embodiment.

Next, operation of this exemplary embodiment will be described in detail, with reference to a flowchart in FIG. 7.

Figure 7:
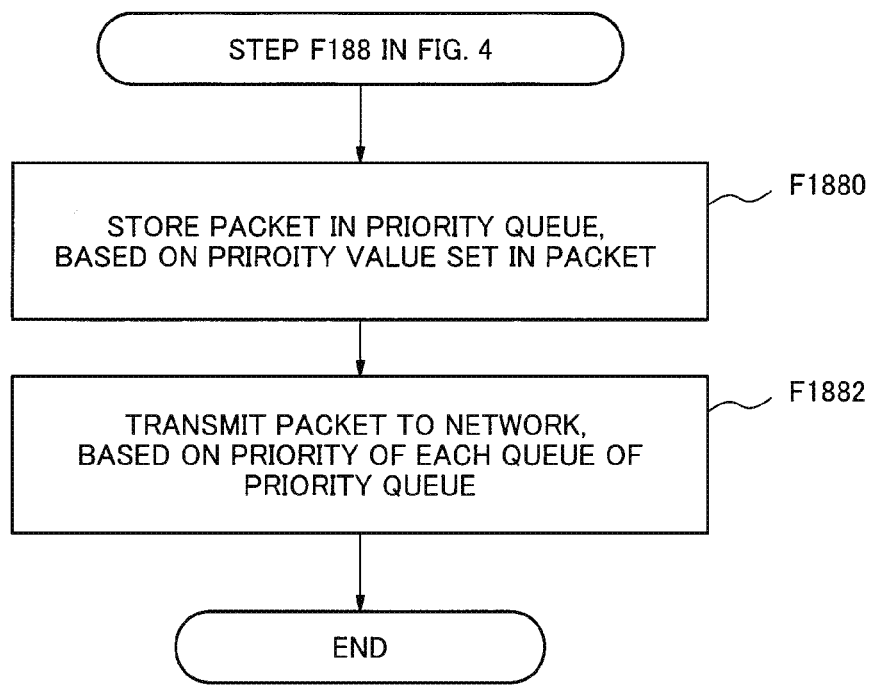
FIG. 7 is a flowchart showing a process of transmitting a packet stored in a priority queue based on the priority of a queue.

FIG. 7 is a flowchart showing a process of transmitting a packet stored in the priority queue 186, based on the priority of the queue by the NIC 18T-2. The NIC 18T-2 in this exemplary embodiment executes the processes up to step F188 in FIG. 4, and then executes the process shown in FIG. 7. Since the processes up to step F188 in FIG. 7 are the same as those in the first exemplary embodiment (refer to FIG. 4), a detailed description of the processes up to step F188 in FIG. 4 will be omitted.

First, the TX controller 182 stores the packet with the priority value set therein in the corresponding queue of the priority queue 186, based on the priority value of the packet (in step F1880 in FIG. 7). When a priority level that can be represented by the priority value set in each packet is wider than a priority level that can be represented by the number of queues that constitute the priority queue 186, a plurality of the priority values may be collectively mapped into one queue. To take an example, based on the value of high-order bits in the field of the packet header indicating the priority value, the plurality of priority values can be allocated to each queue.

Next, the scheduler 187 transfers the packet stored in the queue to the TX interface 188, based on the priority of the queue. The TX interface 188 transmits the transferred packet to the network (in step F1882 in FIG. 7).

In this manner, the NIC 18T-2 transmits the packet to the network, based on the priority of the packet.

The process of calculating error detection data for the packet and then applying the calculated error detection data to the packet can be executed at various timings, in this exemplary embodiment. To take an example, the TX controller 182 may calculate the error detection data for the packet and may apply the calculated error detection data to the packet at a point of time of step F188 in FIG. 4. Alternatively, the scheduler 188 may calculate the error detection data for the packet and may apply the calculated error detection data to the packet at a point of time of step F1882 in FIG. 7.

Now, a description will be directed to a case where the priority queue 186 does not have a capacity of holding the entirety of a packet, by using a drawing. In this exemplary embodiment, a time when the packet is to be transmitted depends on the priority of the queue constituting the priority queue 186 in which the packet is stored. When each stage of the queue does not have a capacity of holding the entirety of the packet, the payload portion of the packet will be discarded at the NIC 18T-2 even if the entirety of the packet has been read in step F182 in FIG. 4.

Figure 8:
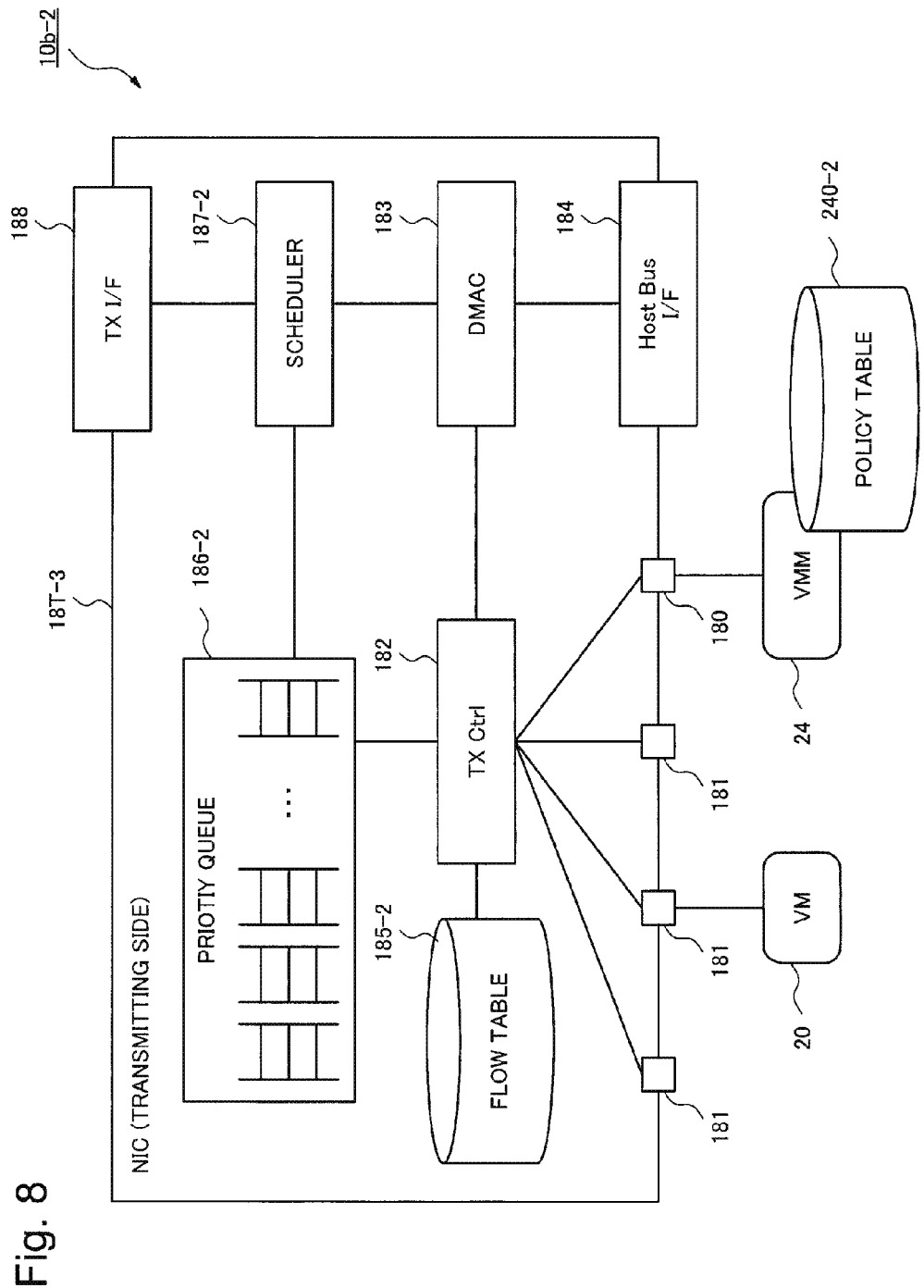
FIG. 8 is a diagram showing a configuration of a variation of the QoS control system according to the second exemplary embodiment of the present disclosure (when the capacity of the priority queue is small).

FIG. 8 shows a configuration of a QoS control system 10b-2 when the priority queue 186 does not have the capacity of holding the entirety of a packet.

Referring to FIG. 8, a NIC 18T-3 in the QoS control system 10b-2 is different from the NIC 18T-2 in the QoS control system 10b.

As compared with the configuration shown in FIG. 6, it is so configured that a scheduler 187-2 can issue to the DMA controller 183 a request for reading data from the host memory, in the NIC 18T-3.

A difference of the process of giving a priority value to a packet and then transmitting the packet based on the priority by the NIC 18T-3 in such a configuration from that in the configuration in the first exemplary embodiment will be described, using FIGS. 4 and 9.

Figure 9:
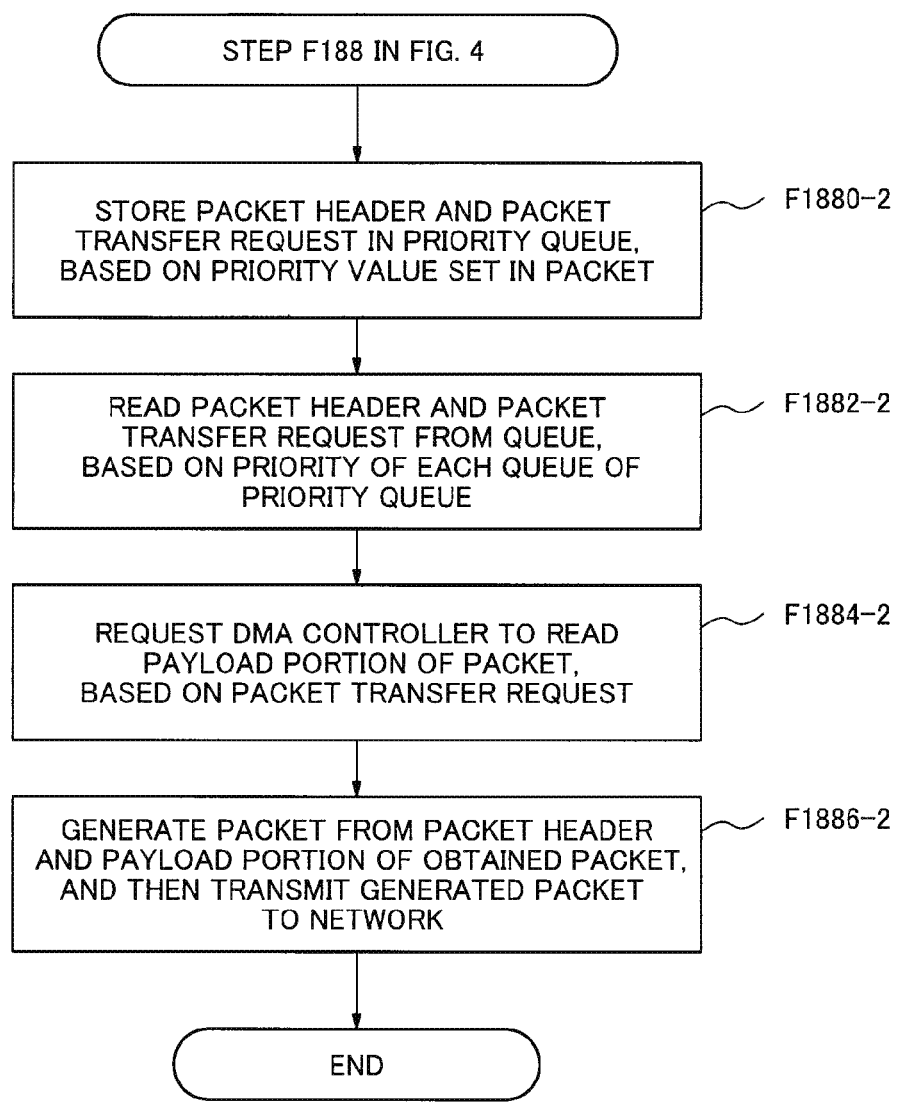
FIG. 9 is a flowchart showing a process of transmitting a packet using the priority queue in the configuration shown in FIG. 8.

FIG. 9 is a flowchart showing a portion of the process of the giving the priority value to the packet and then transmitting the packet based on the priority by the NIC 18T-3.

First, the TX controller 182 reads only the packet header through the DMA controller in step F182 in FIG. 4.

Next, the TX controller 182 obtains the priority value to be applied to the packet according to the procedure of step F184 in FIG. 4 or steps F185 to step F187 in FIG. 4.

Next, the TX controller 182 applies the priority value to the packet header, in step F188 in FIG. 4.

Next, the TX controller 182 stores in the priority queue 186 the packet header and a request for transferring the packet, based on the priority value applied to the packet header (in step F1880-2 in FIG. 9).

Next, the scheduler 187-2 reads the request for transferring the packet and the packet header stored in the queue, based on the priority of the queue (in step F1882-2 in FIG. 9). Then, the scheduler 187-2 requests the DMA controller 183 to read the payload portion of the packet, based on the request for transferring the packet (in step F1884-2 in FIG. 9).

Next, the scheduler 187-2 generates the packet using the read payload portion of the packet and the packet header read in step F1882-2 in FIG. 9, and then transmits the packet to the network through the TX interface 188 (in step F1886-2 in FIG. 9).

In this manner, even in the configuration where the size of each queue of the priority queue 186 is small, the priority value can be given to the packet, and the packet can be transmitted, based on the priority.

The transfer size and the address of the host memory in which the packet is stored may be altered in the request for transferring the packet stored in step F1880-2 in FIG. 9, just corresponding to the region of the packet header that has been already read. Alternatively, the above-mentioned alternation is not made, and the transfer size and the address of the reading source may be altered when the scheduler 187-2 requests the DMA controller 183 to read the payload portion of the packet in step F1884-2 in FIG. 9. Further, the transfer request is not altered, and then the entirety of the packet is read in step F1884-2 in FIG. 9. The packet header portion may be then discarded in step F1884-2 in FIG. 9.

In the case of the configuration in FIG. 8, the process of calculating error detection data for the packet and applying the error detection data for the packet is performed at a point of time in step F1886-2 in FIG. 9 by the scheduler 187-2.

Now, a description will be directed to a process of the NIC 18T-2 when the virtual machine 20 connected to the virtual switch 22 included in the virtual machine monitor 24 is disposed in the QoS control system 10b.

The priority value of a packet to be transmitted by the virtual machine 20 connected to the virtual switch 22 can be set by the virtual switch 22 by referring to the policy table 240-2.

For that reason, assuming that, in the transmission request issued from the virtual switch through the physical interface 180, the priority value based on the policy of a system manager is set in the packet to be transmitted, the TX controller 182 does not perform the processes shown in FIG. 4 and FIG. 7. The TX controller 182 stores the packet in the appropriate queue of the priority queue 186 based on the transfer size and the address included in the request for transmitting the packet and based on the priority value set in the packet read from the host memory by the DMA controller 183.

On the other hand, when a load on the virtual machine monitor 24 increases, communication performance of the virtual machine 20 connected to the virtual switch 22 may deteriorate due to overhead for setting the priority value.

In such a case, an operation of the NIC 18T-2 may be switched so that addition of the priority value is performed by the NIC 18T-2 rather than the virtual switch 22. A method of performing this switching is the same as that described in the first exemplary embodiment of the present disclosure. Thus, a detailed description of the method will be omitted.

As described above, in this exemplary embodiment, a packet is stored in the priority queue 186 included in each of the NIC 18T-2 and the NIC 18T-3, based on the priority value given according to the QoS parameter stored in the flow table 185. The transmission time of the packet stored in the priority queue 186 is scheduled, based on the priority of the queue. With this arrangement, use of a link between a server 10 and a ToR switch 12 can be used, based on the priority.

Third Exemplary Embodiment

Figure 10:
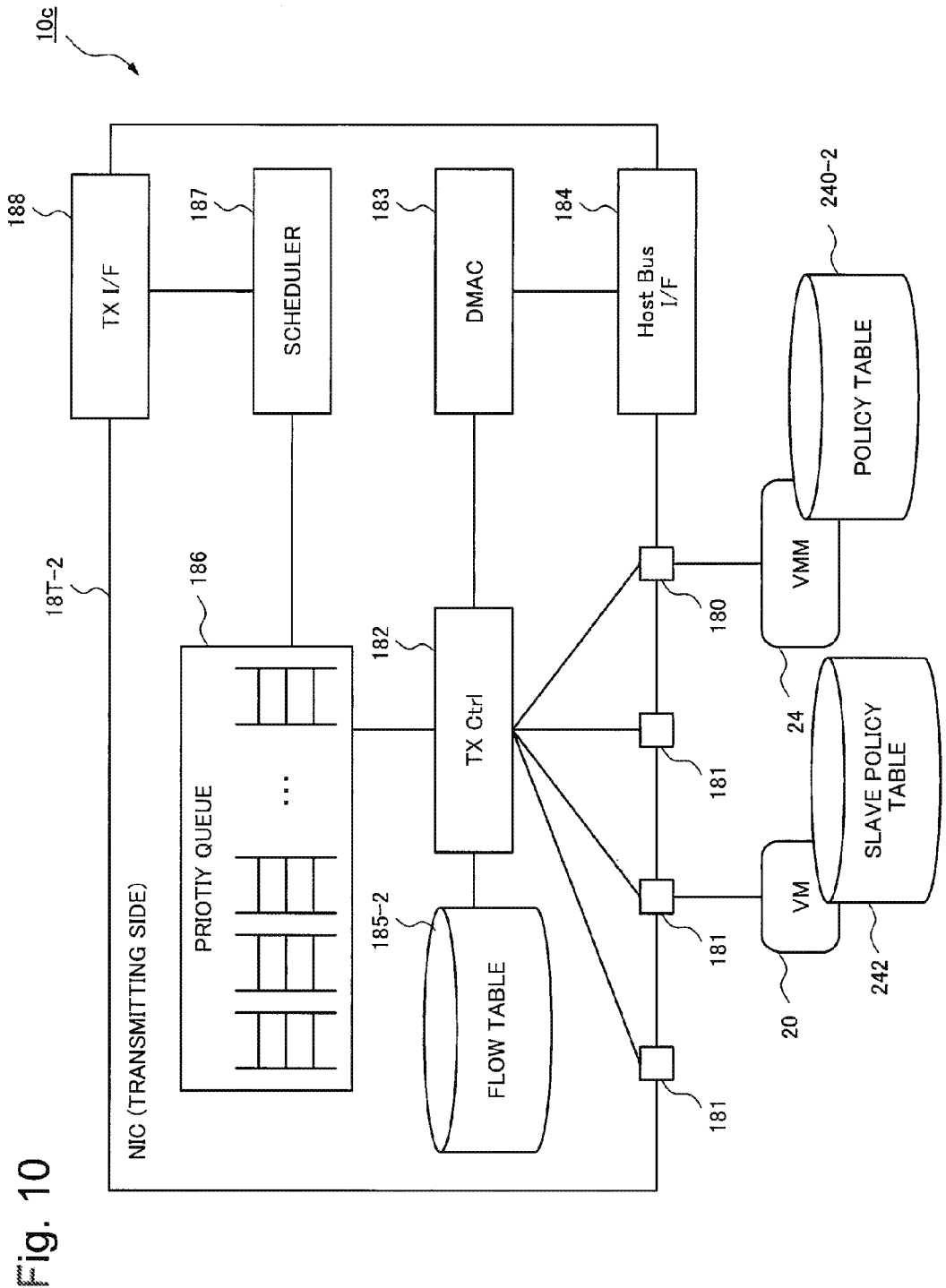
FIG. 10 is a diagram showing a configuration of a QoS control system according to a third exemplary embodiment of the present disclosure.

Next, a third exemplary embodiment of the present disclosure will be described in detail with reference to drawings. FIG. 10 is a diagram showing a configuration of a QoS control system 10c according to the third exemplary embodiment of the present disclosure. Referring to FIG. 10, the configuration in which a slave policy table 242 is added to the virtual machine 20 in the configuration of the second exemplary embodiment is shown. Same reference signs are given to the other components that are the same as those in the second exemplary embodiment of the present disclosure, and a detailed description of the other components that are the same as those in the second exemplary embodiment of the present disclosure will be omitted.

A portion of entries in the policy table 240 is registered in the slave policy table 242. Specifically, when there is one of the respective queues constituting the priority queue 186 that is likely to be overflown, a policy corresponding to the priority of the queue is registered. Assume, for example, that there are 8 queues having numbers of 0 to 7, which constitute the priority queue 186, and the number of each queue without alteration indicates the priority of the queue. Then, it is assumed in this case that the policy of using the queue whose queue number is 5 is set for TCP packet traffic with a destination port number of 80 or 443. When this queue is likely to be overflown, the policy indicating the traffic with the destination port number of 80 and the policy with the destination port number of 443 are stored in the slave policy table.

Each policy stored in the slave policy table 242 indicates that the queue of the priority queue 186 to be used by the traffic that matches the policy is likely to be overflown. For that reason, when each virtual machine 20 creates a packet, each virtual machine 20 checks whether or not an entry having traffic identification information matching the packet header of the packet to be transmitted according to a request for transmitting packet is present in the slave policy table 242 before the request for transmitting the packet is issued to the NIC 18T-2. If the entry is present in the slave policy table 242, the corresponding queue (queue having the number of 5) of the priority queue 186 is likely to be overflown. Thus, the virtual machine 20 can operate to delay issuance of the request for transmitting the packet.

Next, operation of this exemplary embodiment will be described in detail with reference to a sequence diagram in FIG. 11.

Figure 11:
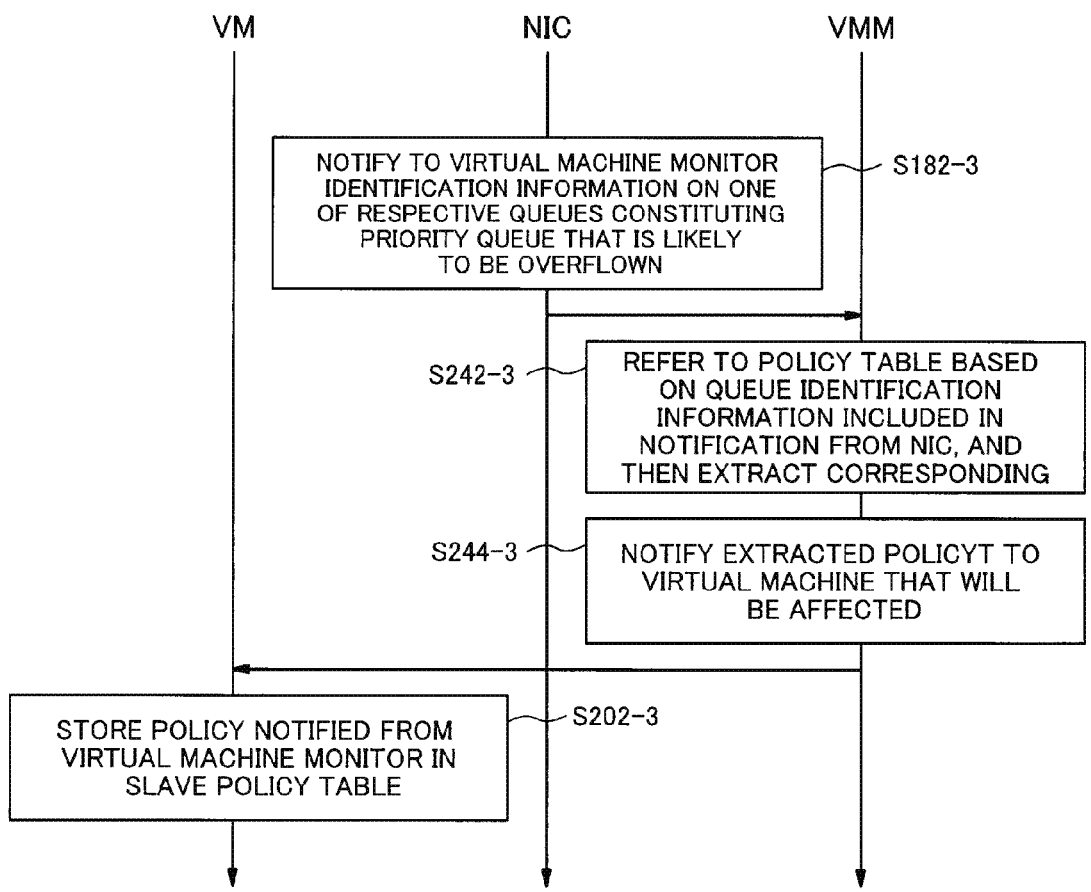
FIG. 11 is a sequence diagram showing an operation of the QoS control system according to the third exemplary embodiment of the present disclosure (of adding an entry to a slave policy table).

FIG. 11 is the sequence diagram showing a process of adding an entry to the slave policy table when one of the queues constituting the priority queue 186 is likely to be overflown.

First, when the one of the queues constituting the priority queue 186 is likely to be overflown, the NIC 18T-2 notifies identification information of the queue to the virtual machine monitor 24 through the physical interface 180 (in step S182-3 in FIG. 11). This notification includes the identification information of the queue that is likely to be overflown. Determination as to whether one of the queues is likely to be overflown can be made by determining whether or not an empty area (the number of accommodatable packets) of each queue has become less than a predetermined threshold value TH1. The NIC 18-T2 may be so configured that the virtual machine monitor 24 can set this threshold value TH1 through the physical interface 180. In this case, the NIC 18-T2 compares the set threshold value TH1 and the empty area of the queue, thereby determining whether or not the queue is likely to be overflown.

Next, the virtual machine monitor 24 refers to the policy table 240-2 to extract the corresponding policy, based on the identification information of the queue that is likely to be overflown included in the notification from the NIC 18T-2 (in step S242-3 in FIG. 11). As described in the second exemplary embodiment, each policy registered in the policy table 240 includes, as a component, information indicating in which queue of the priority queue 186 a packet to be stored. Thus, by comparing the identification information of the queue that is likely to be overflown with the information indicating which queue of the priority queue 186 the packet to be stored, the corresponding policy can be extracted.

Next, the virtual machine monitor 24 notifies the extracted policy to the virtual machine 20 having a possibility that this policy is applied (in step S244-3 in FIG. 11).

Now, a description will be given about the "possibility that the policy is applied", using an example. To take an example, in the case of a policy such as the one for "traffic where the destination port number of a TCP packet is 80", which does not define the transmission source and the destination of the traffic, the policy is notified to all of the virtual machines. On the other hand, in the case of a policy for "traffic having the VLAN ID of 1024", the virtual machine 20 to which the policy is to be applied is limited to the virtual machine 20 having the VALN ID of 1024. Thus, the policy is notified only to the virtual machine 20 belonging to a VLAN having the VLAN ID of 1024. Further, in the case of a policy for "traffic having the transmission source MAC address of 00:11:22:33:44:55 and the VLAN ID of 1024", the virtual machine 20 is uniquely determined. Thus, the policy is notified only to the uniquely determined virtual machine 20.

Next, the virtual machine 20 that has received the notification of the policy registers the policy in the slave policy table 242 (in step S202-3 in FIG. 11).

The notification can also be made so that the policy to be notified to the virtual machine 20 does not include information on the priority value to be set.

Next, a process of deleting an entry from the slave policy table according to the operation of this exemplary embodiment will be described in detail, with reference to a sequence diagram in FIG. 12.

Figure 12:
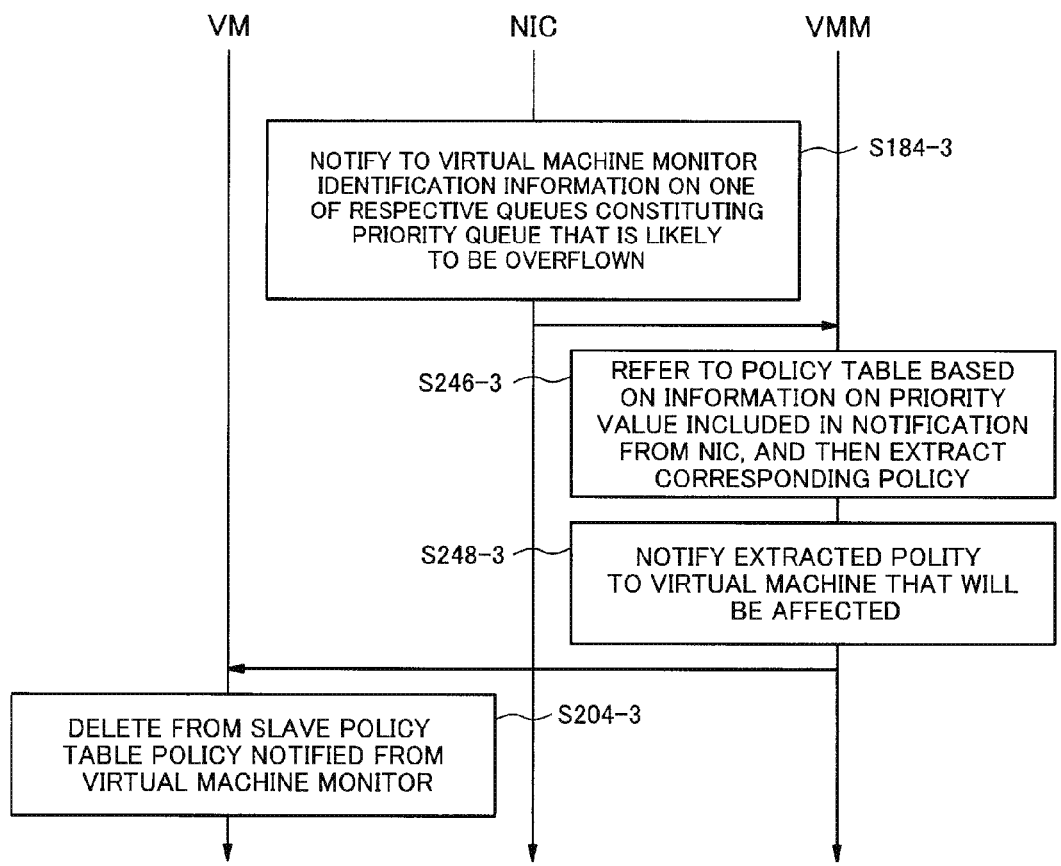
FIG. 12 is a sequence diagram showing a different operation of the QoS control system according to the third exemplary embodiment of the present disclosure (of deleting an entry from the slave policy table).

FIG. 12 is the sequence diagram showing the process of deleting an entry from the slave policy table 24 when one of the queues constituting the priority queue 186 that is likely to be overflown obtains an empty area. Determination as to whether the one of the queues obtains the empty area can be made by determining whether or not the empty area (the number of accommodatable packets) of each queue has become not less than a predetermined threshold value TH2. This threshold value TH2 may be the same value as the threshold value TH1 described above, or may be a different value. Since an example of a method of setting this threshold value TH2 is the same as in the case of the threshold value TH1, a detailed description of the method of setting this threshold value TH2 will be omitted.

First, when the one of the queues constituting the priority queue 186 that is likely to be overflown obtains the empty area, the NIC 18T-2 notifies the identification information of the queue to the virtual machine monitor 24 through the physical interface 180 (in step S184-3 in FIG. 12).

Next, the virtual machine monitor 24 refers to the policy table 240 to extract the corresponding policy, based on the identification information of the queue that has obtained the empty area included in the notification from the NIC 18T-2 (in step S246-3 in FIG. 12). As described in the second exemplary embodiment, each policy stored in the policy table 240 includes, as the component of the policy, the information indicating in which queue of the priority queue 186 the packet to be stored. Thus, by comparing the identification of the queue that has obtained the empty area with the information indicating which queue of the priority queue 186 the packet to be stored, the corresponding policy can be extracted.

Next, the virtual machine monitor 24 notifies the extracted policy to the virtual machine 20 having the possibility that this policy is applied (in step S248-3 in FIG. 12).

Next, the virtual machine 20 that has received the notification of the policy deletes the notified policy from the slave policy table 242. When the notified policy is deleted from the slave policy table 242, the traffic identification included in the notified policy can be used so as to search the slave policy table 242.

Next, a process of suppressing a request for transmitting a packet by the virtual machine 20 using the slave policy table 242 will be described in detail, with reference to a sequence diagram in FIG. 13 and a flowchart in FIG. 14.

Figure 13:
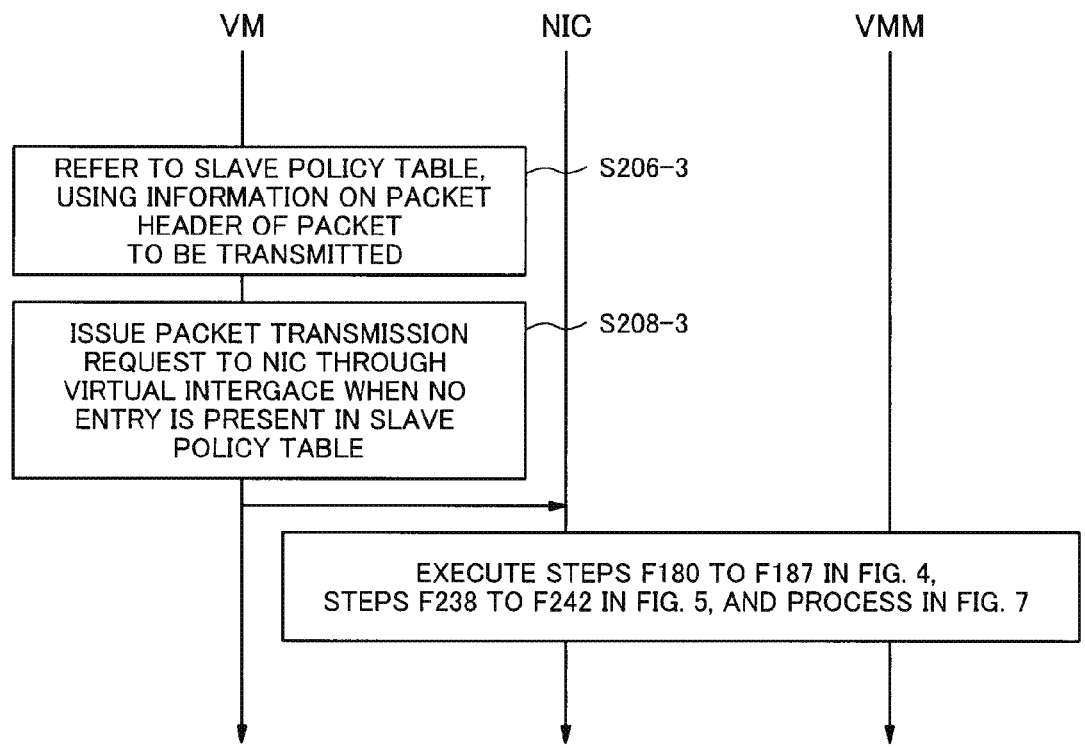
FIG. 13 is a sequence diagram showing a process of issuing a packet transmission request by a virtual machine in the QoS control system according to the third exemplary embodiment of the present disclosure.

FIG. 13 is the sequence diagram showing a process of issuing the request for transmitting the packet by the virtual machine 20, using the slave policy table 242.

First, when the virtual machine 20 creates the packet to be transmitted, the virtual machine 20 refers to the slave policy table 242 using the information on the packet header of the created packet before issuing the request for transmitting the packet to the NIC 18T-2 (in step S206-3 in FIG. 13).

Next, when no entry is present in the slave policy table 242, the virtual machine 20 issues the request for transmitting the packet to the NIC 18T-2 through the virtual interface 181 (in step S208-3 in FIG. 13).

Thereafter, the NIC 18T-2 and the virtual machine monitor 24 execute steps F180 to F188 in FIG. 4, step F238 to F242 in FIG. 5, and the process in FIG. 7. The packet is thereby transmitted to the network.

Figure 14:
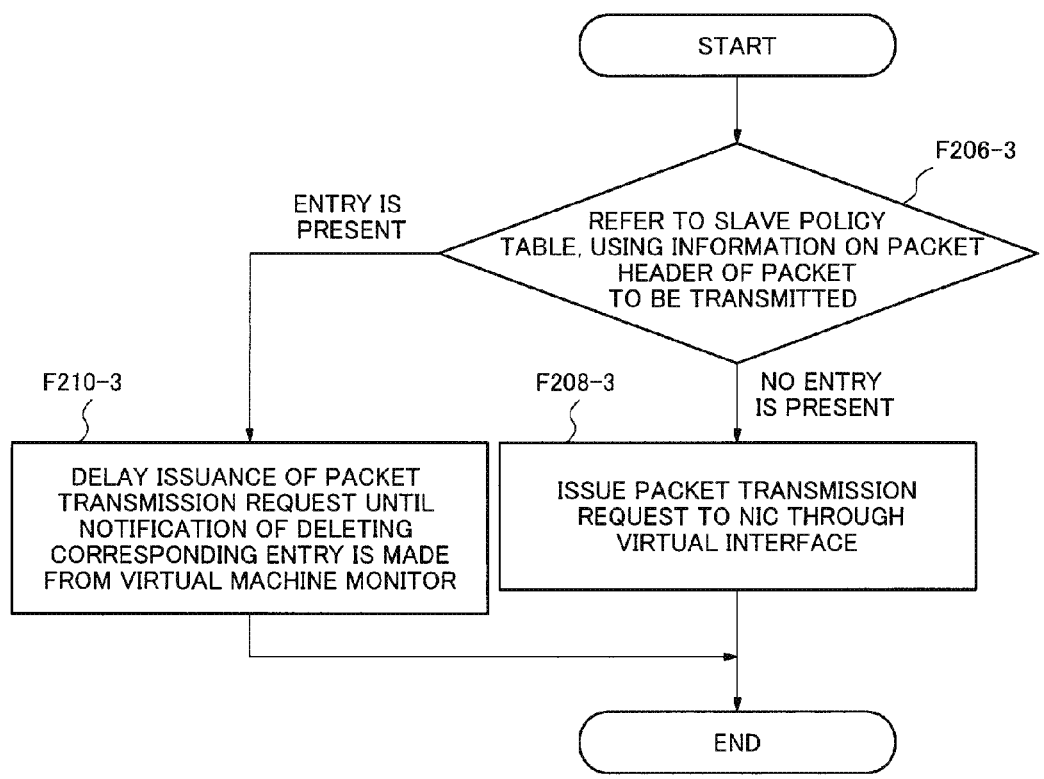
FIG. 14 is a flowchart showing a process of issuing a packet transmission request by a virtual machine 20 in the QoS control system according to the third exemplary embodiment of the present disclosure.
Figure 15:
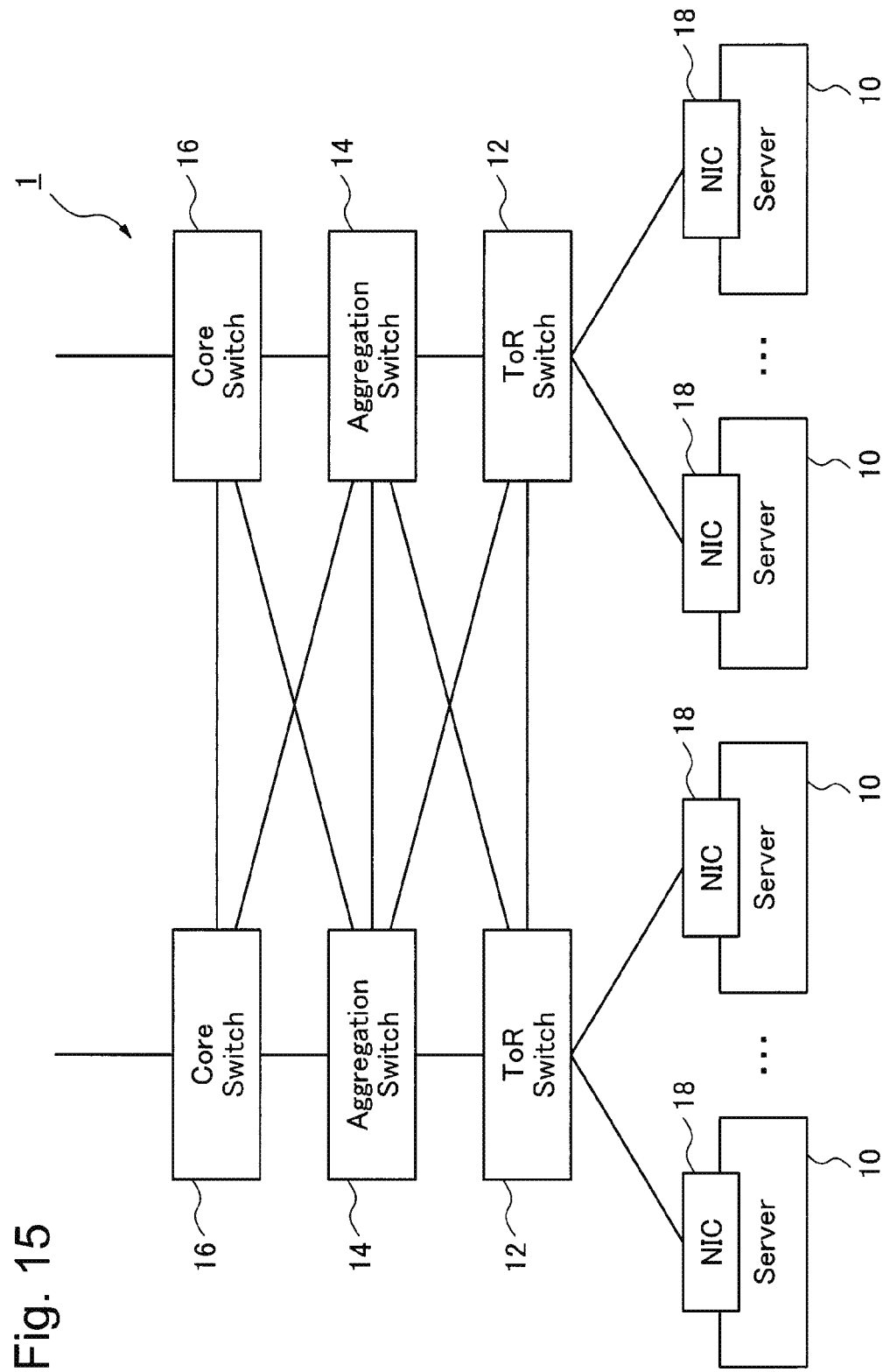
FIG. 15 is a diagram showing a network architecture of a data center before a server virtualization technology is introduced.
Figure 16:
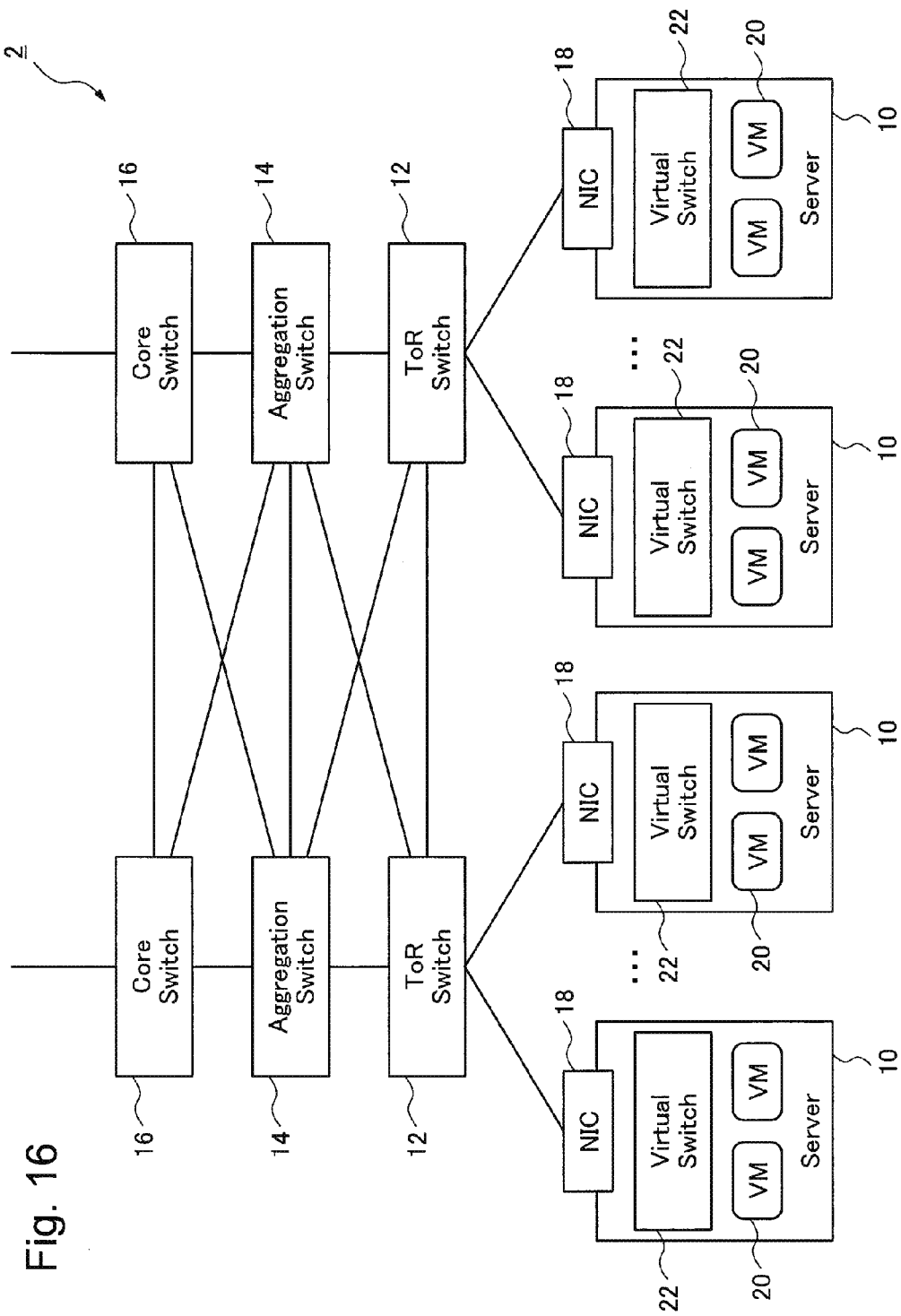
FIG. 16 is a diagram showing a network architecture when the server virtualization technology has been introduced into the environment in FIG. 15.

FIG. 14 is the flowchart showing a process of issuing a request for transmitting a packet by the virtual machine 20, using the slave policy table 242.

First, when the virtual machine 20 creates the packet to be transmitted, the virtual machine 20 refers to the slave policy table 242 using the information on the packet header of the created packet before issuing the request for transmitting the packet to the NIC 18T-2 (in step S206-3 in FIG. 14).

Next, when no entry is present in the slave policy table 242 ("no entry is present" in step F206-3 in FIG. 14), the virtual machine 20 issues the request for transmitting the packet to the NIC 18T-2 through the virtual interface 181 (in step F208-3 in FIG. 14).

On the other hand, when the entry is present in the slave policy table 242 ("entry is present" in step F206-3 in FIG. 14), the virtual machine 20 delays issuance of the request for transmitting the packet until notification of deleting the entry is made from the virtual machine monitor 24 (in step F210-3 in FIG. 14).

When the virtual machine 20 issues the request for transmitting the packet corresponding to this entry though the entry is present in the slave policy table 242, the transmission request is discarded at the NIC 18T-2. Overflowing of the queue can be thereby prevented.

As described above, in this exemplary embodiment, when one of the queues constituting the priority queue 186 is likely to be overflown, notification of the queue that is likely to be overflown is made to the virtual machine monitor 24 from the NIC 18T-2, and, through the virtual machine 24, notification is made to the virtual machine 20 that will be affected. With this arrangement, issuance of a request for communication using the queue that is likely to be overflown can be prevented by the virtual machine 20.

In the first to third exemplary embodiments, it is so configured that the policy table 240 or the policy table 240-2 is provided at the virtual machine monitor 24 and that, when each of the network interface card 18T-1, the network interface card 18T-2, and the network interface card 18T-3 makes an inquiry about the QoS parameter that is not registered in the flow table 185 or the flow table 185-2, each of the network interface 18T-1, the network interface 18T-2, and the network interface 18T-3 makes the inquiry to the virtual machine monitor 24. It may also be so configured that the policy table 240 is provided at a controller installed outside the server 10 and to be managed by the system manager, and the inquiry is made to this controller. As a method of making the inquiry to the external controller, a method of making the inquiry through the TX interface 188, or use of a different external management interface when the server 10 includes the external management interface may be considered. In this case, it may be configured to ask the virtual machine monitor 24 to issue a request for inquiring about the QoS parameter to the external controller.

Each of the first to third exemplary embodiments of the present disclosure is configured, under assumption of a server virtualization environment. Application of the present disclosure is not limited to the server virtualization environment. To take an example, even if a bare metal OS has been introduced into the server that constitute each of the QoS control systems 10a, 10b, 10b-2, and 10c without using the server virtualization environment, the QoS control of the present disclosure can also be applied by controlling the NIC 18 using the external controller operated by the system manager.

Finally, preferred modes of the present disclosure are summarized.

<First Mode>

(See the QoS control system in the first aspect described above).

<Second Mode>

In the QoS control system according to the first mode, the network interface may obtain the packet from a memory, in response to a request for transmitting the packet from an outside, may store the priority value in the packet using the QoS parameter having the identification information that matches the packet, and then may transmit the resulting packet.

<Third Mode>

In the QoS control system according to the first or second mode, when the network interface does not hold the QoS parameter having identification information that matches a packet to be transmitted, the network interface may request the network interface management unit to transmit the QoS parameter.

<Fourth Mode>

In the QoS control system according to the third mode, the network interface management unit may obtain from the QoS policy the QoS parameter having identification information that is the same as the identification information of the packet for which transmission of the QoS parameter has been requested from the network interface, and then may notify the obtained QoS parameter to the network interface.

<Fifth Mode>

In the QoS control system according to any one of the first to fourth modes, the network interface may further comprise:

a priority queue constituted by one or more queues each with a priority set therein; and a scheduler that schedules packet transmission according to the priority of the queue constituting the priority queue.

<Sixth Mode>

In the QoS control system according to the fifth mode, the network interface may hold information for specifying (priority of) the priority queue, for each traffic, as the QoS parameter.

<Seventh Mode>

In the QoS control system according to the sixth mode, the network interface may store one of the packet, a packet header, and the request for transmitting the packet, to which the QoS parameter has been applied in one of the queues of the priority queues, based on the information for specifying from the priority queue.

<Eighth Mode>

In the QoS control system according to one of the fifth to seventh modes, the network interface may include a function of notifying a status of use of the priority queue to the network interface management unit.

<Ninth Mode>

In the QoS control system according to the eighth mode, the network interface management unit may further hold identification information of each queue constituting the priority queue, as the QoS policy;

based on the status of use of the priority queue notified from the network interface, the network interface management unit may select the QoS policy having the queue identification information that matches identification information of the queue, and then may notify the selected QoS policy to an issuance source of the request for transmitting the packet; and the issuance source of the request for transmitting the packet may suppress the request for transmitting the packet or may resume transmission of the request for transmitting the packet, according to the notification including the QoS policy.

<Tenth Mode>

In the QoS control system according to any one of the first to ninth modes, the network interface may set whether or not to provide the priority value at the network interface; and setting of whether or not to provide the priority value may be changed by the network interface management unit, thereby allowing control of whether or not to provide the priority value at the network interface.

<Eleventh Mode>

(See the QoS control method in the second aspect described above).

<Twelfth Mode>

(See the program in the third aspect described above).

The eleventh mode and the twelfth mode can be developed into the second to tenth modes, like the first mode.

Each disclosure of the above-listed cited Patent Literature and Non Patent Literature is incorporated herein by reference. Modification and adjustment of each exemplary embodiment and each example are possible within the scope of the overall disclosure (including the claims) of the present disclosure and based on the technical concept of the present disclosure. Various combinations and selections of various disclosed elements (including each element in each claim, each element in each exemplary embodiment and each example, and each element in each drawing) are possible within the scope of the claims of the present disclosure. That is, the present disclosure naturally includes various variations and modifications that could be made by those skilled in the art according to the overall disclosure including the claims and the technical concept.

REFERENCE SIGNS LIST

1 data center network architecture
2 data center network architecture
10 server
10*a* QoS control system
10*b* QoS control system
10*b*-2 QoS control system
10*c* QoS control system
12 Top-of-Rack switch
14 aggregation switch
16 core switch
18 network interface card
18T-1~18T-3 network interface card transmission unit
20 virtual machine
22 virtual switch
24 virtual machine monitor
180 physical interface
181 virtual interface
182 TX controller
183, 183-2 DMA controller
184 host bus interface
185, 185-2 flow table
186 priority queue
187, 187-2 scheduler
188 TX interface
240 policy table
242, 240-2 slave policy table

What is claimed is:

1. A Quality of Service (QoS) control system, comprising:
a network interface comprising a priority queue constituted by one or more queues to which a priority is set at each, and a scheduler that schedules packet transmission according to the priority of a selected queue of the priority queue,
the network interface being configured
to hold a QoS parameter including identification information for identifying traffic, a priority value to be applied to a packet belonging to the traffic, and information indicating a field in the packet to which the priority value is stored, and
to store the priority value in the packet belonging to the traffic, and then to transmit a resulting packet according to the QoS parameter; and
a network interface management unit that is configured
to hold a QoS policy including the QoS parameter being applied to each traffic and identification information of each queue constituting the priority queue,
to select the QoS policy for the priority queue based on the status of use of the priority queue notified from the network interface,
to notify the selected QoS policy to an issuance source of the request for transmitting the packet,
an issuance source being able to transmit the packet by use of the network interface, and being configured to suppress or to resume transmission of the request for transmitting the packet, according to the notification including the QoS policy received from the network interface management unit.

2. The QoS control system according to claim 1, wherein the network interface obtains the packet from a memory, in response to a request for transmitting the packet from an outside, sets the priority value in the packet using the QoS parameter having the identification information that matches the packet, and then transmits the resulting packet.

3. The QoS control system according to claim 1, wherein when the network interface does not hold the QoS parameter having identification information that matches a packet to be transmitted, the network interface requests the network interface management unit to transmit the QoS parameter.

4. The QoS control system according to claim 3, wherein the network interface management unit obtains from the QoS policy the QoS parameter having identification information that is the same as the identification information of the packet for which transmission of the QoS parameter has been requested from the network interface, and then notifies the obtained QoS parameter to the network interface.

5. The QoS control system according to claim 1, wherein the network interface stores one of the packet, a packet header, and the request for transmitting the packet, to which the QoS parameter has been applied in one of the queues of the priority queues, based on information for specifying (priority of) the priority queue.

6. The QoS control system according to claim 1, wherein the network interface is configured to set whether or not to provide the priority value at the network interface; and
the network interface management unit changes the setting of whether or not to provide the priority value, and thereby controls whether or not to provide the priority value at the network interface.

7. The QoS control system according to claim 1, wherein the network interface management unit is further configured to determine, based on the empty area of the queue constituting the priority queue, the queue of which overflow is likely to occur, and to notify one or more entries of the QoS policy corresponding to the determined queue, to the issuance source of the request for transmitting the packet,
the issuance source of the request for transmitting the packet being further configured to include a slave policy table to which one or more entries of the QoS policy notified from the network interface management unit can be stored, and to delay issuing of the request for transmitting the packet to which one or more entries of the QoS policy stored in the slave policy table can be applied.

8. A QoS (Quality of Service) control method comprising the steps of:
scheduling, by a scheduler that schedules packet transmission according to a priority of a selected queue that is part of a priority queue;
holding, by a network interface having the priority queue constituted by one or more queues, including the selected queue, to which a priority is set at each, a QoS parameter including identification information for identifying traffic, a priority value to be applied to a packet belonging to the traffic, and information indicating a field in the packet to which the priority value is stored;
storing, by the network interface, the priority value in the packet belonging to the traffic, and then to transmit a resulting packet according to the QoS parameter;
holding, by a network interface management unit, a QoS policy including the QoS parameter being applied to each traffic and identification information of each queue constituting the priority queue;
selecting, by the network interface management unit, the QoS policy for the priority queue based on the status of use of the priority queue notified from the network interface;
notifying, by the network interface management unit, the selected QoS policy to an issuance source of the request for transmitting the packet,
the issuance source being able to transmit the packet by use of the network interface, and being configured to suppress or to resume transmission of the request for transmitting the packet, according to the notification including the QoS policy received from the network interface management unit.

9. A non-transitory computer-readable storage medium recorded with a QoS (Quality of Service) control program causing a computer to realize a scheduler, a network interface, and a network interface management interface, and to perform a method comprising:
scheduling, by the scheduler that schedules packet transmission according to a priority of a selected queue that is part of a priority queue;
holding, by the network interface having the priority queue constituted by one or more queues, including the selected queue, to which a priority is set at each, a QoS parameter including identification information for identifying traffic, a priority value to be applied to a packet belonging to the traffic, and information indicating a field in the packet to which the priority value is stored;
storing, by the network interface, the priority value in the packet belonging to the traffic, and then to transmit a resulting packet according to the QoS parameter;

holding, by the network interface management unit, a QoS policy including the QoS parameter being applied to each traffic and identification information of each queue constituting the priority queue;

selecting, by the network interface management unit, the QoS policy for the priority queue based on the status of use of the priority queue notified from the network interface;

notifying, by the network interface management unit, the selected QoS policy to an issuance source of the request for transmitting the packet, an issuance source being able to transmit the packet by use of the network interface, and being configured to suppress or to resume transmission of the request for transmitting the packet, according to the notification including the QoS policy received from the network interface management unit.

10. The QoS control system according to claim 1, wherein when the priority queue does not configured to have enough capacity to store the entire packet, the network interface stores, in one of the queues constituting the priority queues, a packet header of the packet to which the QoS parameter has been applied and request for transmitting the packet, the scheduler reads the packet header and the request for transferring the packet stored in the queue, when transmitting the packet according to the priority of the queue, and the network interface reads the payload portion of the packet from the memory based on the request for transferring the packet, and generates the entire packet to be sent, by use of the read packet header and the read payload portion.

* * * * *